(12) United States Patent
Eronen et al.

(10) Patent No.: US 9,888,335 B2
(45) Date of Patent: Feb. 6, 2018

(54) METHOD AND APPARATUS FOR PROCESSING AUDIO SIGNALS

(75) Inventors: Antti Eronen, Tampere (FI); Pasi Ojala, Kirkkonummi (FI)

(73) Assignee: Nokia Technologies Oy, Espoo (FI)

( * ) Notice: Subject to any disclaimer, the term of this patent is extended or adjusted under 35 U.S.C. 154(b) by 335 days.

(21) Appl. No.: 13/378,338

(22) PCT Filed: Jun. 23, 2009

(86) PCT No.: PCT/FI2009/050559
§ 371 (c)(1),
(2), (4) Date: Mar. 15, 2012

(87) PCT Pub. No.: WO2010/149823
PCT Pub. Date: Dec. 29, 2010

(65) Prior Publication Data
US 2012/0163606 A1    Jun. 28, 2012

(51) Int. Cl.
*H04S 7/00* (2006.01)
*H04S 3/00* (2006.01)
(Continued)

(52) U.S. Cl.
CPC ............ *H04S 7/302* (2013.01); *H04M 3/568* (2013.01); *H04R 1/406* (2013.01); *H04R 3/005* (2013.01);
(Continued)

(58) Field of Classification Search
CPC .... H04R 3/00; H04R 3/005; H04R 2227/003; H04R 27/00; H04R 1/406; H04R 5/027;
(Continued)

(56) References Cited

U.S. PATENT DOCUMENTS 5,335,011 A * 8/1994 Addeo .................... H04N 7/15
348/14.1
5,360,971 A   11/1994 Kaufman et al.
(Continued)

FOREIGN PATENT DOCUMENTS

CN    101384105 A    3/2009
EP     1205762 A1    5/2002
(Continued)

OTHER PUBLICATIONS

Faller et al., "Binaural Cue Coding—Part II: Schemes and Applications", IEEE Transactions on Speech and Audio Processing, vol. 11, Issue 6, Nov. 2003, pp. 520-531.
(Continued)

*Primary Examiner* — Duc Nguyen
*Assistant Examiner* — Yogeshkumar Patel
(74) *Attorney, Agent, or Firm* — Alston & Bird LLP

(57) ABSTRACT

An apparatus (300) comprises—one or more inputs ($IN_1$, $IN_2$) to receive two or more different audio signals ($S_1$, $S_2$),—an input ($IN\_{VDI1}$) to receive a direction signal ($S_{VDI1}$) and—a signal processing unit (100) arranged to generate a processed audio signal ($S_{AUDIO1}$) from said two or more different audio signals ($S_1$, $S_2$), said processed audio signal ($S_{AUDIO1}$) comprising an enhanced audio signal ($S_{ENC1}$) corresponding to a sound ($SND_2$) originating from a location ($x_2y_2$) indicated by said direction signal ($S_{VDI1}$).

17 Claims, 14 Drawing Sheets

(51) Int. Cl.
  *H04M 3/56* (2006.01)
  *H04R 1/40* (2006.01)
  *H04R 3/00* (2006.01)
  *H04R 5/027* (2006.01)
  *H04R 27/00* (2006.01)
  *H04N 13/00* (2006.01)

(52) U.S. Cl.
  CPC .............. *H04R 5/027* (2013.01); *H04R 27/00* (2013.01); *H04R 2227/003* (2013.01); *H04S 3/008* (2013.01); *H04S 2420/03* (2013.01)

(58) Field of Classification Search
  CPC ..... H04N 7/144; H04S 3/008; H04S 2420/03; H04S 2420/11; H04S 7/30; H04S 7/302; G10L 19/008; H04M 3/568
  USPC .......... 381/91, 92, 122, 17, 107, 22; 348/43, 348/14.09, 14.08, 14.13, 46
  See application file for complete search history.

(56) References Cited

U.S. PATENT DOCUMENTS

| | | | |
|---|---|---|---|
| 5,742,264 A | | 4/1998 | Inagaki et al. |
| 5,940,118 A | | 8/1999 | Van Schyndel |
| 6,118,888 A | * | 9/2000 | Chino et al. ................. 382/118 |
| 6,717,607 B1 | | 4/2004 | Lauper et al. |
| 6,894,714 B2 | | 5/2005 | Gutta et al. |
| 6,937,272 B1 | * | 8/2005 | Dance ...................... 348/208.2 |
| 7,116,787 B2 | | 10/2006 | Faller |
| 2002/0101505 A1 | * | 8/2002 | Gutta ..................... H04N 7/15 348/14.07 |
| 2003/0086366 A1 | * | 5/2003 | Branlund .......... H04B 1/71052 370/208 |
| 2004/0076301 A1 | | 4/2004 | Algazi et al. |
| 2004/0105557 A1 | | 6/2004 | Matsuo |
| 2006/0023871 A1 | * | 2/2006 | Shaffer ................. H04R 27/00 379/420.01 |
| 2006/0140420 A1 | | 6/2006 | Machida |
| 2007/0025560 A1 | | 2/2007 | Asada |
| 2007/0160219 A1 | * | 7/2007 | Jakka ..................... H04S 3/004 381/22 |
| 2008/0130904 A1 | * | 6/2008 | Faller ................... G10L 19/008 381/17 |
| 2008/0232601 A1 | | 9/2008 | Pulkki |
| 2008/0252595 A1 | | 10/2008 | Boillot |
| 2008/0267422 A1 | | 10/2008 | Cox |
| 2008/0292112 A1 | | 11/2008 | Valenzuela et al. |
| 2008/0297586 A1 | * | 12/2008 | Kurtz .................... H04N 7/147 348/14.08 |
| 2008/0298597 A1 | | 12/2008 | Turku et al. |
| 2009/0116652 A1 | | 5/2009 | Kirkeby et al. |
| 2009/0129620 A1 | | 5/2009 | Tagawa et al. |
| 2010/0128892 A1 | * | 5/2010 | Chen ...................... H04R 3/005 381/92 |

FOREIGN PATENT DOCUMENTS

| | | |
|---|---|---|
| SE | 0501989 A | 3/2007 |
| WO | 2002/078390 A2 | 10/2002 |
| WO | 2007/085682 A1 | 8/2007 |
| WO | 2009/101238 A1 | 8/2009 |

OTHER PUBLICATIONS

Breebaart et al., "Parametric Coding of Stereo Audio", EURASIP Journal on Applied Signal Processing, 2005, pp. 1305-1322.
"Light Gun", From Wikipedia, the free encyclopedia, Retrieved on Apr. 5, 2013, Webpage available at: http://en.wikipedia.org/wiki/Light_gun.
"Steering Wheel", From Wikipedia, the free encyclopedia, Retrieved on Apr. 5, 2013, Webpage available at: http://en.wikipedia.org/wiki/Steering_wheel.
"Wii Remote", From Wikipedia, the free encyclopedia, Retrieved on Apr. 5, 2013, Webpage available at: http://en.wikipedia.org/wiki/Wii_Remote.
Baumgarte et al., "Binaural Cue Coding—Part I: Psychoacoustic Fundamentals and Design Principles", IEEE Transactions on Speech and Audio Processing, vol. 11, Issue 6, Nov. 2003, pp. 509-519.
International Search Report and Written Opinion received for corresponding Patent Cooperation Treaty Application No. PCT/FI2009/050559, dated Mar. 23, 2010, 15 pages.
International Preliminary Report on Patentability received for corresponding Patent Cooperation Treaty Application No. PCT/FI2009/050559, dated Oct. 7, 2011, 58 pages.
Office Action received for corresponding Canadian Application No. 2,765,116, dated Nov. 8, 2013, 3 pages.
Office Action from Chinese Patent Application No. 200980160095.0 dated Aug. 25, 2014.
Office Action for Chinese Application No. 200980160095.0 dated May 13, 2015.
Office Action for Canadian Application No. 2,765,116 dated Feb. 17, 2015.
Extended European Search Report from corresponding European Patent Application No. 09846424.1 dated Oct. 15, 2015.
Office Action and Examination Search Report from corresponding Canadian Patent Application No. 2,765,116 dated Dec. 4, 2015.
Office Action from corresponding Chinese Patent Application No. 2009801600950 dated Nov. 30, 2015.
Office Action for corresponding Canadian Application No. 2,765,116 dated Nov. 7, 2016.
Office Action for Canadian Application No. 2,765,116 dated Oct. 17, 2017, 5 pages.

\* cited by examiner

METHOD AND APPARATUS FOR PROCESSING AUDIO SIGNALS

RELATED APPLICATION

This application was originally filed as PCT Application No. PCT/FI2009/050559 filed Jun. 23, 2009.

The present invention relates to processing of audio signals.

BACKGROUND

An audio processing system may comprise several microphones arranged to capture several audio signals. The audio signals may be processed for transmission via a transmission path at a high bit rate.

However, there may be a need to reduce the bandwidth needed for transmitting the audio signals. The audio processing system may be used e.g. as a part of a teleconference system.

It is known that parametric coding techniques, e.g. binaural cue coding (BCC), may be used to reduce the bit rate in multi-channel audio transmission.

SUMMARY

An object of the present invention is to provide apparatus for processing audio signals. A further object of the invention is to provide a method for processing audio signals.

According to a first aspect of the invention, there is provided an apparatus disclosed herein.

According to a second aspect of the invention, there is provided a method disclosed herein.

According to a third aspect of the invention, there is provided a computer program disclosed herein.

According to a fourth aspect of the invention, there is provided a computer readable medium disclosed herein.

An apparatus according to the present invention (300) may comprise:
- one or more inputs ($IN_1$, $IN_2$) to receive two or more different audio signals ($S_1$, $S_2$),
- an input ($IN_{VDI1}$) to receive a direction signal ($S_{VDI1}$), and
- a signal processing unit (100) arranged to generate a processed audio signal ($S_{AUDIO1}$) from said two or more different audio signals($S_1$, $S_2$), said processed audio signal ($S_{AUDIO1}$) comprising an enhanced audio signal ($S_{ENC1}$) corresponding to a sound ($SND_2$) originating from a location ($x_2,y_2$) indicated by said direction signal ($S_{VDI1}$).

Thanks to enhancing an audio signal based on a direction signal provided by a direction indicator, the total bit rate needed for the audio transmission may be reduced. The information of the desired direction of arrival may be utilized to improve the quality of the spatial audio coding and representation.

Conventional spatial audio coding schemes treat the whole audio scene equally with the intention to represent the whole audio image at the best possible perceptual quality at a given bit rate. However, e.g.

for conversational services there may be a need to represent only the essential content of interest, and to consider the remaining audio scene as ambience in order to optimize the audio quality in the direction of interest.

The direction of interest within an auditory image may be determined by using a direction detecting unit. For example, the direction detecting unit may be a gaze direction detecting device.

The auditory image may be captured by concentrating on the determined direction of interest, e.g. by using a directional microphone array.

Audio signal components of the auditory image in the determined direction of interest may be encoded using a higher bit rate, wherein the remaining audio components may be encoded at a lower bit rate. In other words, audio signals originating from a selected direction of arrival may be coded more accurately than the rest of the audio image.

In an embodiment, the direction signal may be provided by a gaze direction tracking device. Consequently, an audio signal in the direction of interest may be enhanced. As an example, a participant of a teleconference may enhance the voice of a most relevant speaker simply by looking at said speaker or by looking at a displayed image of said speaker.

In an embodiment, a direction signal provided by the direction indicator may be used to steer the direction of maximum sensitivity of a directional microphone array.

The system and the method according to the invention may provide efficient and flexible coding of spatial audio content concentrated towards the direction of interest in a surrounding audio scene. Spatial audio parameterization may be extracted from the direction of interest indicated by a gaze direction detecting device or other means for pointing out the direction of interest. In an embodiment, the rest of the audio scene may be handled with coarser parameterization and coding. In an embodiment, the rest of the audio scene may be handled as ambience noise with minimum number of parameters and with a low bit rate.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which.

All drawings are schematic.

DETAILED DESCRIPTION

Figure 1A:
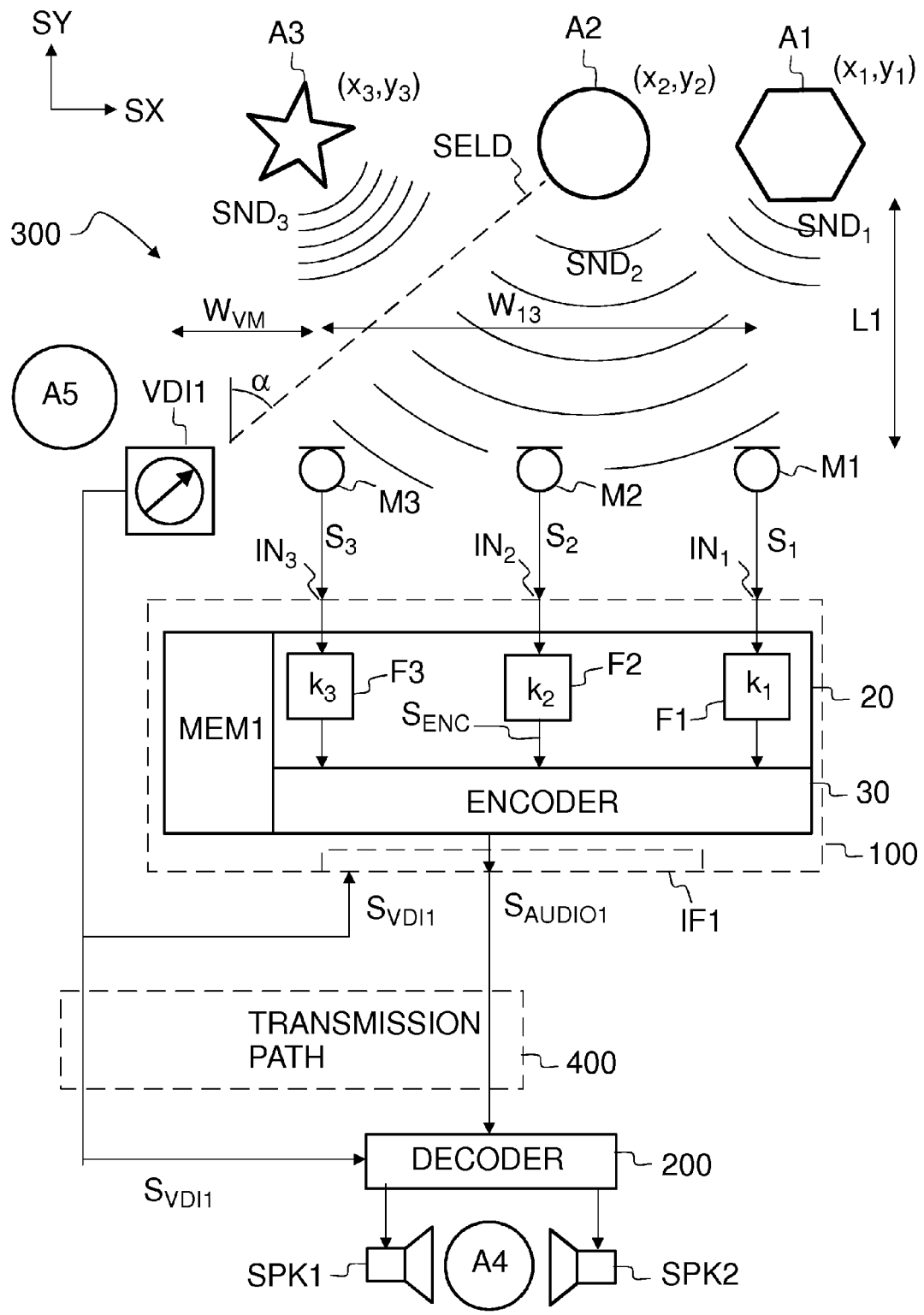
FIG. 1a shows an audio processing system, wherein a direction selecting unit is located on the transmitting side of the system.

Referring to FIG. 1a, an audio processing system 300 may comprise two or more microphones M1, M2, M3, a direction selecting unit VDI1, a signal processing unit 100, and one or more electro-acoustic transducers SPK1, SPK2.

Sounds may originate from sound sources A1, A2, A3, which are in different spatial locations $(x_1,y_1)$, $(x_2,y_2)$, $(x_3,y_3)$. The sound sources A1, A2, A3 may be any audio sources in an auditory scene, e.g. participants attending a meeting.

Sounds $SND_1$, $SND_2$, $SND_3$ emitted from the sources A1, A2, A3 may be captured by the microphones M1, M2, M3 in order to provide audio signals $S_1$, $S_2$, $S_3$, respectively.

The microphones M1, M2, M3 may have different sensitivities for sounds emitted from the sources A1, A2, A3 e.g. due to different distances between the sound sources and the microphones, due to directional emission patterns of sound sources, and/or due to directional sensitivity of a microphone.

For example, the first microphone M1 may be sensitive primarily to sounds emitted from the first source A1, and the first microphone M1 may be less sensitive to sounds emitted from the second source A2 and the third source A3. The second microphone M2 may be sensitive to sounds emitted from the second source A2, the third microphone may be sensitive to sounds emitted from the third source A3, etc.

The audio signals $S_1$, $S_2$, $S_3$ may be converted into digital form, and processed for transmission and/or storage e.g. in a memory device. If desired, a processed audio signal $S_{AUDIO1}$ corresponding to said audio signals $S_1$, $S_2$, $S_3$ may be sent via a transmission path 400. In order to reduce the total bit rate required for the transmission, the signal processing unit 100 may be arranged to allocate a higher bit rate for audio signals originating from a selected spatial location indicated by the direction selecting unit VDI1, and the signal processing unit 100 may be arranged to allocate a lower bit rate for audio signals originating from the other locations.

In particular, the signal processing unit 100 may be arranged to enhance an audio signal originating from a spatial location indicated by the direction selecting unit VDI1. In other words, the signal processing unit 100 may be arranged to suppress audio signals originating from the other locations.

The direction selecting unit VDI1 provides a signal $S_{VDI1}$, which may comprise information about the direction of the selected spatial location with respect to a reference direction. The direction may be expressed e.g. by a horizontal angle α between the direction SY and a line SELD drawn from the direction selecting unit VDI1 to the selected location.

The signal $S_{VDI1}$ may also comprise information about a vertical angle between the direction SY and the line SELD.

The direction selecting unit VDI1 may be operated by a user A5. The direction selecting unit VDI1 may be e.g. a gaze direction detecting device, a satellite navigation device, an electronic compass, a gyroscopic compass, or an integrating accelerometer. The electronic compass may comprise e.g. a magnetic field sensor based on the Hall effect.

The direction selecting unit VDI1 may be arranged to detect the gaze direction of the user A5, or the user may manually direct a compass or accelerometer towards the selected location. A satellite navigating device, e.g. a GPS device (Global Positioning System) may be moved in a desired direction in order to provide a direction signal $S_{VDI1}$.

The signal processing unit 100 may comprise a filtering unit 20. The filtering unit 20 may comprise a set of filters F1, F2, F3. An audio signal $S_1$ captured by the first microphone M1 may be filtered by a first filter F1, an audio signal $S_2$ captured by the second microphone M2 may be filtered by a second filter F2, and an audio signal $S_3$ captured by the third microphone M3 may be filtered by a third filter F3.

The filters F1, F2, F3 of the filtering unit 20 may be arranged to change the level of at least one of the audio signals (e.g. $S_2$) with respect to the other audio signals (e.g. $S_1$, $S_3$) such that an audio signal originating from a spatial location indicated by the direction selecting unit VDI1 may be enhanced. The filters may change the level of at least one of the audio signals $S_1$, $S_2$, $S_3$ according to to the direction signal SVDI1 provided by the direction selecting unit VDI1.

Each filter F1, F2, F3 may comprise a filter coefficient or coefficients $k_1$, $k_2$, $k_3$. The symbol $k_1$ may denote a single scalar multiplier. The coefficients $k_1$, $k_2$, $k_3$ may be scalar multipliers. For example, the audio signal $S_1$ may be multiplied by a first filter coefficient $k_1$, the audio signal $S_2$ may be multiplied by a second filter coefficient $k_2$, and the audio signal $S_3$ may be multiplied by a third filter coefficient $k_3$ so as to enhance the selected audio signal.

Each symbol $k_1$, $k_2$, $k_3$ may also denote a set of filter coefficients. In particular, the symbol $k_1$ may denote an array representing coefficients of a digital filter F1. For example, when a direction corresponding to the location $(x_2,y_2)$ of the second source A2 has been selected, then the signal processing unit 100 may be arranged to set the values of second filter coefficients $k_2$ greater than the values of first filter coefficients $k_1$ and third filter coefficients $k_3$. Consequently, the level of the audio signal $S_2$ of the second microphone M2 may be selectively enhanced in order to provide an enhanced audio signal $S_{ENC}$.

The levels of the audio signals may be adjusted when they are in analog or digital form.

The signal processing unit 100 may comprise an encoder 30. The encoder 30 may be a parametric encoder (see FIG. 8a). In particular, the encoder may be arranged to provide a binaural cue coded signal (BCC). The encoder 30 may be arranged to convert time domain signals into frequency domain. The levels of the audio signals may also be changed in the frequency domain instead of adjusting the levels in the time domain. For example, fourier transformed signals may be multiplied in the frequency domain by coefficients $k_1$, $k_2$, $k_3$, . . . instead of multiplying the audio signals $S_1$, $S_2$, $S_3$ in the time domain.

The signal processing unit 100 may be arranged to provide a processed audio signal $S_{AUDIO1}$, which comprises an enhanced audio signal $S_{ENC}$ corresponding to sounds originating from a location indicated by the direction signal. For example, the enhanced audio signal $S_{ENC}$ may correspond to sounds $SND_2$ originating from a location $(x_2,y_2)$.

The processed audio signal $S_{AUDIO1}$ may be e.g. a monophonic audio signal. A monophonic audio signal $S_{C1}$ may be reproduced via a single transducer SPK1. However in that case the auditory image is not reproduced at the receiving end of the system 300.

When the receiver decodes and renders only the downmixed signal, the listener may concentrate only to the audio source, which has been selected by the direction selecting unit VDI1.

In order to reproduce spatial effects, the system 300 may comprise a decoder 200 arranged to provide two or more audio signals based on a coded audio signal $S_{AUDIO1}$. The separated audio signals may be reproduced via two or more electro-acoustic transducers SPK1, SPK2 so that a listener A4 at the receiving end of the system 300 may hear the reproduced audio image. The transducers SPK1, SPK2 may be e.g. loudspeakers or headphones.

The coded audio signal $S_{AUDIO1}$ may be binaural cue coded (BCC), and the decoder 200 may be arranged to convert the coded audio signal $S_{AUDIO1}$ into two different audio channels for stereo reproduction via the transducers SPK1, SPK2.

The processed audio signal $S_{AUDIO1}$ may be binaural cue coded (BCC), and the decoder 200 may be arranged to convert the audio signal $S_{AUDIO1}$ into three or more audio channels for reproduction via loudspeakers. For example, the decoder 200 may be arranged to convert the audio signal $S_{AUDIO1}$ into 5.1 surround sound or 7.1 surround sound. A 5.1 surround sound system has five loudspeakers positioned at different directions with respect to a listener, and a low frequency effects channel (LFE). A 7.1 surround sound system has seven loudspeakers positioned at different directions with respect to a listener, and a low frequency effects channel (LFE).

In general, the decoder 200 may be arranged to provide 1, 2, 3, 4, 5, 6, 7, 8, 9, 10, or more different audio channels based on a processed audio signal $S_{AUDIO1}$.

If desired, the signal $S_{VDI1}$ provided by the direction selecting unit VDI1 may also be transmitted via the transmission path 400. The direction signal $S_{VDI1}$ may be coupled to the decoder 200. Consequently, a reproduced audio signal can be rendered according to the direction indicated by the direction signal $S_{VDI1}$, if desired.

The audio signals $S_1$, $S_2$, $S_3$ captured by the microphones M1, M2, M3 may be coupled to respective inputs $IN_1$, $IN_2$, $IN_3$ of the signal processing unit 100. The signal processing unit 100 may comprise an interface IF1 for providing the processed audio signal $S_{AUDIO1}$ for transmission by a transmitter (not shown) and/or for receiving the direction signal $S_{VDI1}$ from a receiver (not shown). However, the signal processing unit 100 may comprise a transmitter and/or the decoder 200 may comprise a receiver.

The signal processing device 100 may comprise a memory MEM1 for e.g. storing computer program code for operating said signal processing device 100.

If the distance $W_{VM}$ between the direction indicator VDI1 and the microphones M1, M2, M3 is large when compared with the minimum distance L1 between the sources A1, A2, A3 and the microphones M1, M2, M3, then the data processing unit 100 may be arranged to take into account the position of the direction indicator VDI1 with respect to the microphones M1, M2, M3 and/or the distances between the sound sources A1, A2, A3 and the microphones.

The distance WVM between the direction indicator VDI1 and the microphones M1, M2, M3 is preferably smaller than 25% of the minimum distance L1 between the sources A1, A2, A3 and the microphones M1, M2, M3.

If desired, the audio signals $S_1$, $S_2$, $S_3$ may also be multiplexed before coupling to the signal processing device 100 via a single input $IN_1$. The signal processing device 100 may comprise a demultiplexer arranged to distribute the audio signals $S_1$, $S_2$, $S_3$ to different filters F1, F2, F3, respectively.

SX, SY, and SZ denote orthogonal directions. The direction SY may be interpreted e.g. as a reference direction. The direction SX may be interpreted e.g. as a horizontal direction, and the direction SZ may be interpreted e.g. as a vertical direction.

Figure 1B:
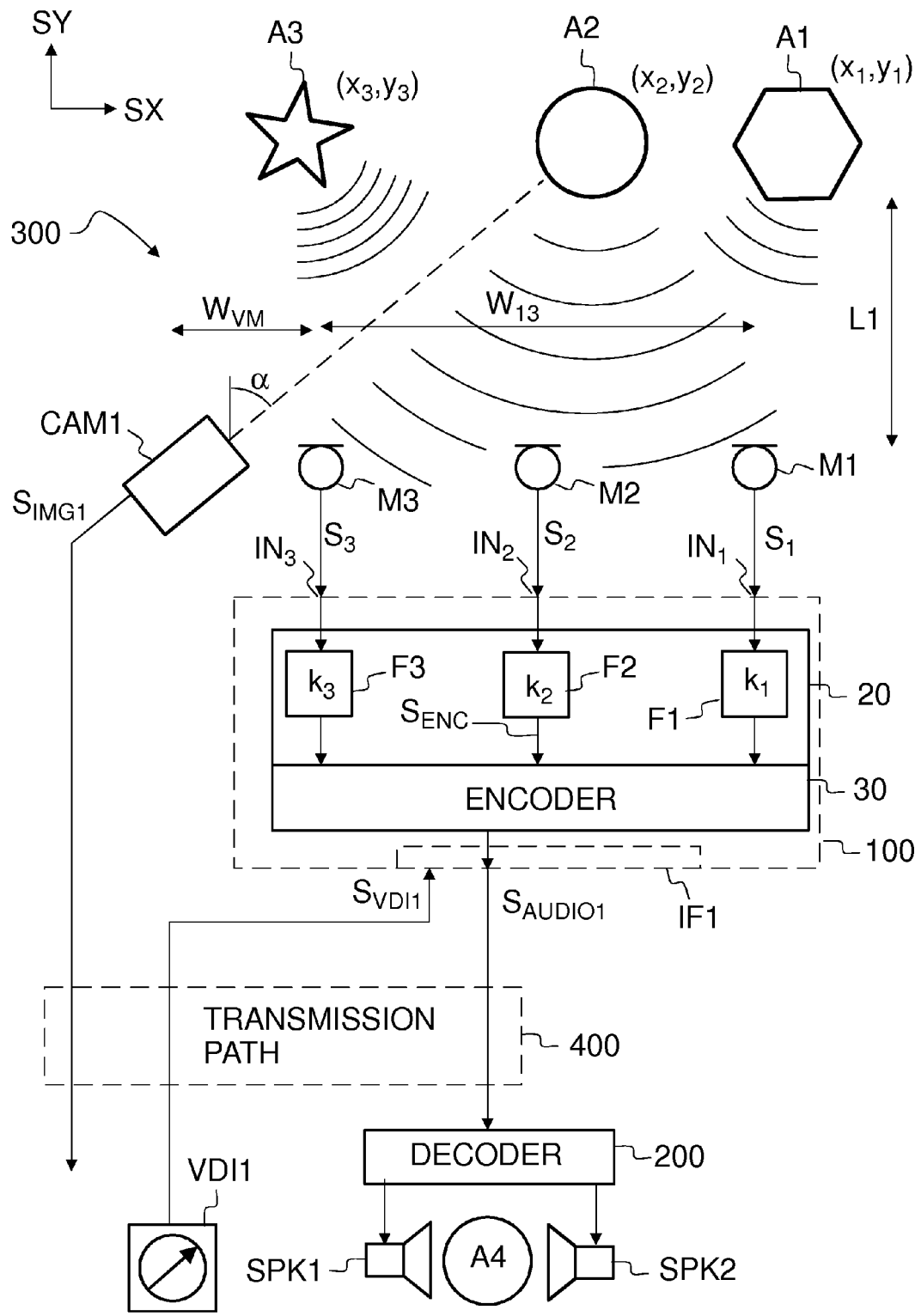
FIG. 1b shows an audio processing system, wherein a direction selecting unit is located on the receiving side of the system.

Referring to FIG. 1b, the direction signal SVDI1 may also be sent via a transmission path 400. In particular, the direction selecting unit VDI1 may be operated by the listener A4 at the receiving end of the system 300.

The direction indicator VDI1 may be located on the receiving side of the system 300, and the direction signal SVDI1 may be sent via the transmission path 400 to the transmitting side in order to control the signal processing unit 100.

The system 300 may further comprise a camera CAM1 for capturing visual images corresponding to the audio sources A1, A2, A3. The camera CAM1 may be arranged to send an image signal $S_{IMG1}$ via the transmission path 400 to the receiving side. A respective image corresponding to the audio sources may be displayed e.g. on a screen (see FIG. 6). The signals $S_{AUDIO1}$, $S_{IMG1}$, $S_{VDI1}$ may also be sent via different transmission paths 400. For example, the visual image signal $S_{IMG1}$ and the processed audio signal $S_{AUDIO1}$ may be sent via a television broadcasting network, and the direction signal $S_{VDI1}$ may be sent from a remote listener A4 to a TV studio via a mobile telephone network.

Figure 2:
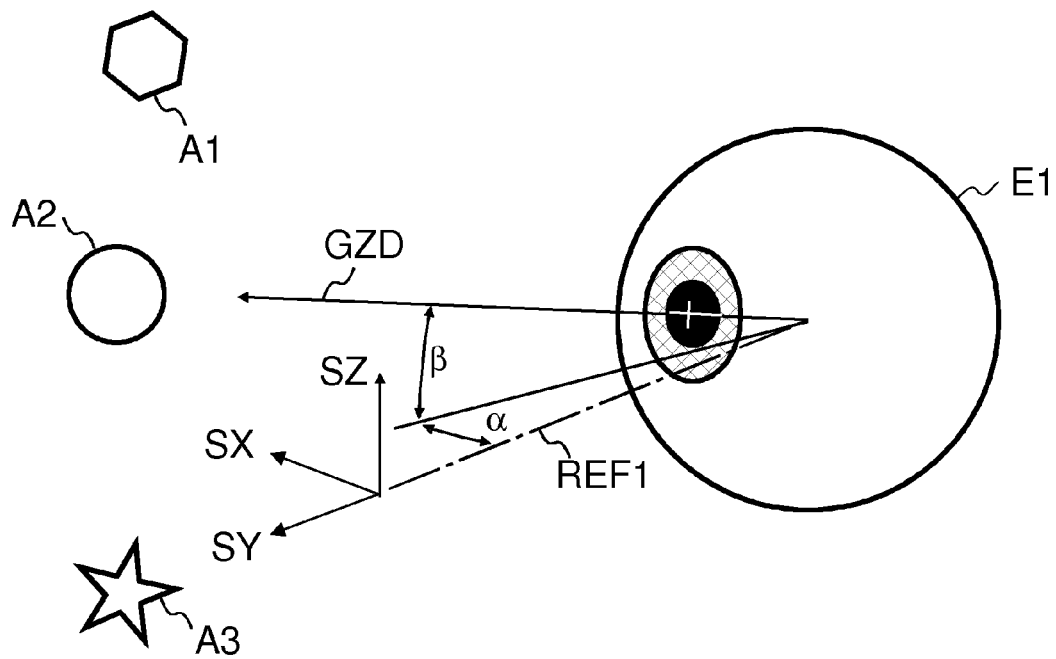
FIG. 2 shows the gaze direction of an eye.

Referring to FIG. 2, the direction signal SVDI1 may be provided e.g. by using a gaze direction detecting device. FIG. 2 shows the gaze direction GZD of any eye E1. By monitoring the gaze direction GZD, it may be determined whether the eye E1 is looking at an object A1, A2, or A3. In particular, the objects may be audio sources. The gaze direction GZD may be defined e.g. by a horizontal angle α between the gaze direction GZD and a reference direction REF1, and by a vertical angle β between the gaze direction GZD and the reference direction REF1. The reference direction REF1 may be e.g. aligned with the direction SY.

Figure 3:
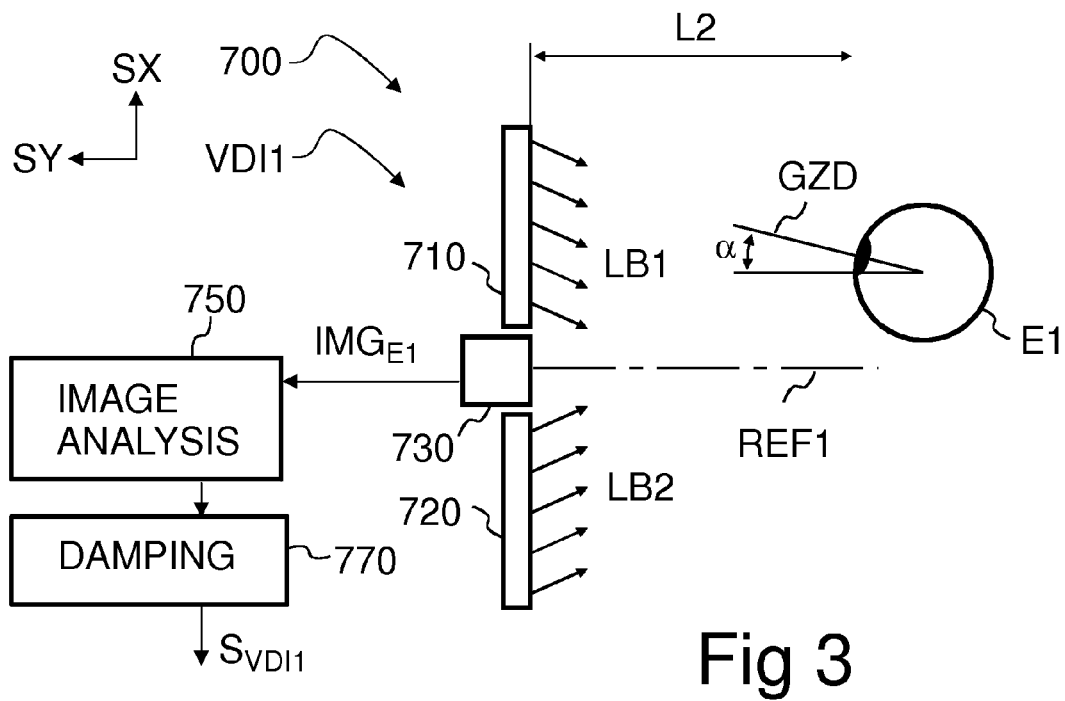
FIG. 3 shows a gaze direction detecting device.

FIG. 3 shows a gaze direction detecting device 700. The gaze direction detecting device 700 may comprise one or more light sources 710, 720 and an imaging unit 730. The light sources 710, 720 may be arranged to emit light beams LB1, LB2.

The gaze direction detecting device 700 may further comprise an image analysis unit 750 to determine the gaze direction GZD on the basis of an image $IMG_{E1}$ captured by the imaging unit 730. The gaze direction detecting device 700 may further comprise a damping unit 770 to reduce fluctuations in the direction signal $S_{VDI1}$.

The light sources 710, 720, the image analysis unit 750 and/or the damping unit 770 may also be external components. For example the sun or another external substantially point-like light source may also be utilized as a light source 710.

In particular, the light beams LB1, LB2 provided by the light sources 710, 720 may be substantially collimated at the position of the eye E1 in order facilitate accurate determination of the gaze direction GZD.

Figure 4:
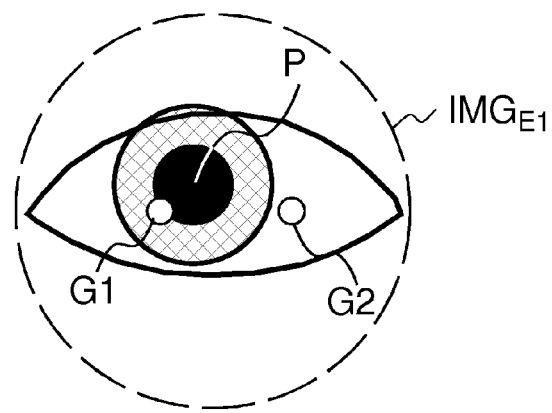
FIG. 4 shows an image of an eye, as captured by an image sensor of the gaze direction detecting device.

FIG. 4 shows an image $IMG_{E1}$ of the eye E1 captured by the imaging unit 730 of the gaze direction detecting device 700. Light emitted from a light source 710, 720 is reflected from the surface of the eye E1. Consequently, the image $IMG_{E1}$ may comprise one or more reflection spots G1, G2 known as the Purkinje images. The horizontal gaze angle α and/or the vertical gaze angle β may be determined based on the position of the pupil P with respect to the Purkinje images G1, G2.

The use of two or more Purkinje images G1, G2 improves accuracy and may make the determination of the gaze angles α and β substantially independent of the distance between the eye E1 and the tracker device 700. However, in some embodiments of the invention, a lower accuracy may be tolerated, and it may be sufficient if the gaze angles α and β are estimated by using only one Purkinje image G1 or G2.

Some mobile telephones comprise a camera unit. Even the camera unit of a mobile telephone may be used as an imaging unit of a gaze direction detecting device 700 if a signal processing device is arranged to determine the gaze direction based on an image $IMG_{E1}$ captured by said camera unit. Signal processing capabilities of said mobile telephone or an external portable computer may be used for analyzing the gaze direction.

Figure 5A:
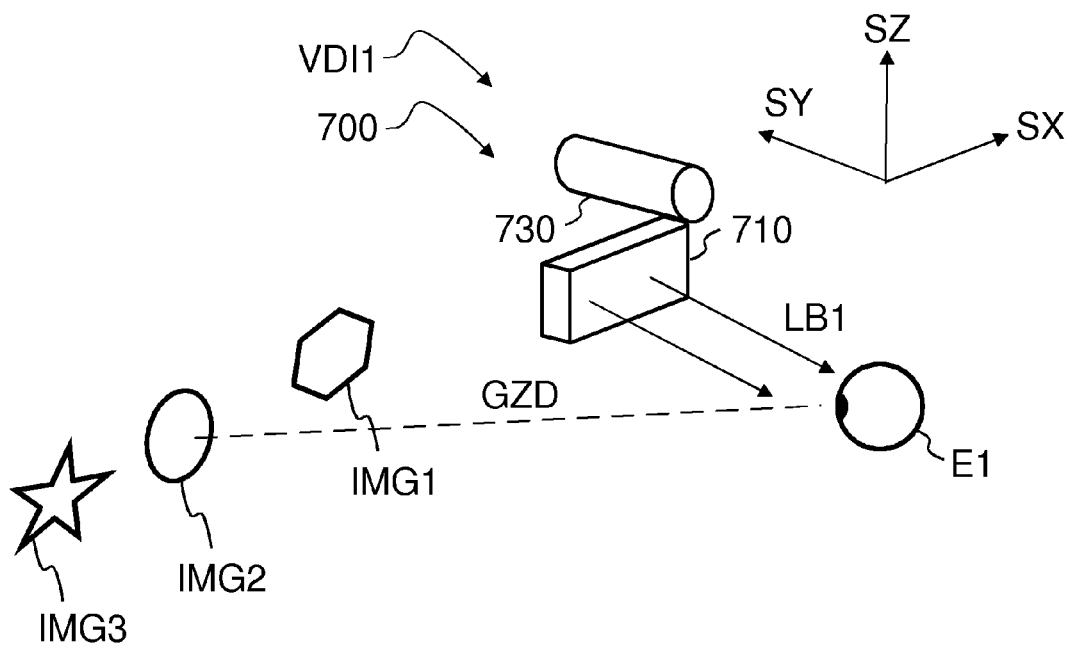
FIG. 5a shows an eye looking at real objects, wherein the gaze direction of the eye is monitored by a gaze direction detecting device.

Referring to FIG. 5a, a gaze direction detecting device 700 may be arranged to detect whether the eye E1 is looking at the location of the sound source A1, A2, or A3. The direction selecting unit VDI1 may be located at the transmitting side of the audio transmission system 300. The direction selecting unit VDI1 may be a gaze direction detecting device 700 arranged to monitor the gaze direction of the user A5 (FIG. 1).

The direction selecting unit VDI1 or the signal processing unit 100 may comprise a damping unit 770 to eliminate rapid fluctuations of the direction signal $S_{VDI1}$, because rapid fluctuations in the audio image experienced by the listener A4 may be rather annoying. For example, the direction selecting unit VDI1 may be arranged such that the eye E1 has to look at new location at least during a predetermined time period before the value of the direction signal $S_{VDI1}$ is changed. The predetermined time period may be e.g. 10 seconds. The signal processing unit 100 may be arranged such that the eye E1 has to look at new location at least during a predetermined time period before the values of the filter coefficients $k_1$, $k_2$, $k_3$ of the filtering unit 20 are altered.

Alternatively, the system 300 may comprise several direction selecting units VDI1 operated by several users, and the direction signal $S_{VDI1}$ may be determined by voting. In other words, the total range of possible directions may be divided into a set of adjacent sectors, and the number of direction selecting units indicating directions within each range may be counted. A direction corresponding to the sector with the highest count may be used to indicate the selected location. For example, the gaze direction of e.g. ten participants may be monitored, and if e.g. six of them are looking at a certain location, then the signal processing unit 100 may be arranged to enhance audio signals originating from said location. For monitoring the gaze directions, images of the eyes of several participants may be captured simultaneously by a single camera, if sufficient image resolution can be provided.

Figure 5B:
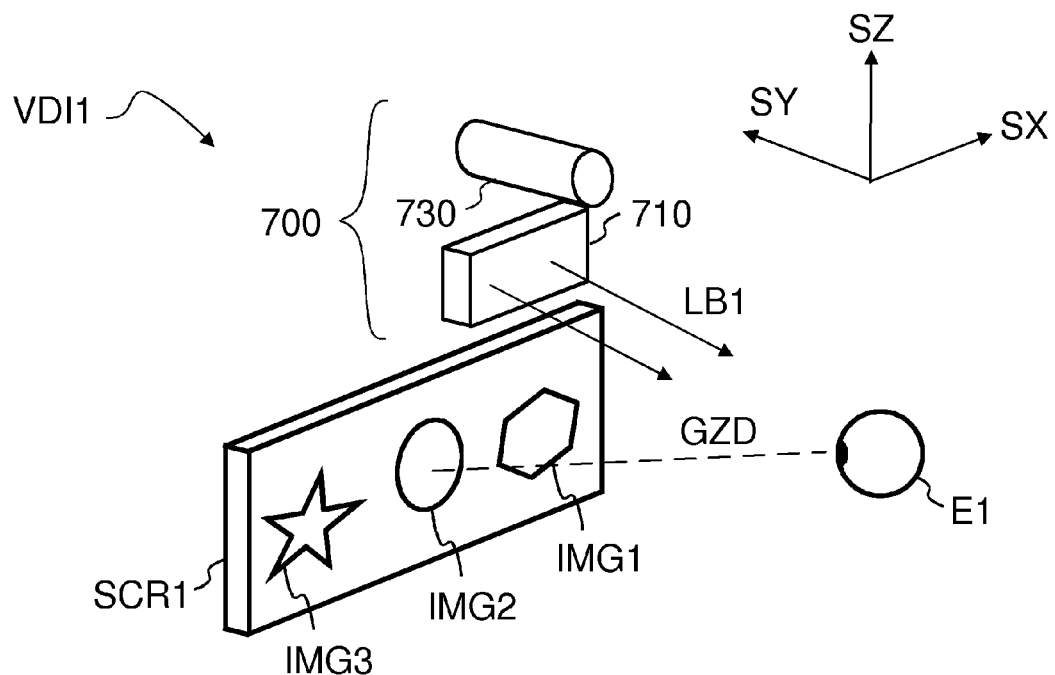
FIG. 5b shows an eye looking at images of objects, wherein the gaze direction of the eye is monitored by a gaze direction detecting device.

Referring to FIG. 5b, visual images IMG1, IMG2, IMG3 corresponding to the audio sources A1, A2, A3 may be also be displayed on a screen SCR1, and the gaze direction may be determined by a gaze direction detecting device 700.

Figure 5C:
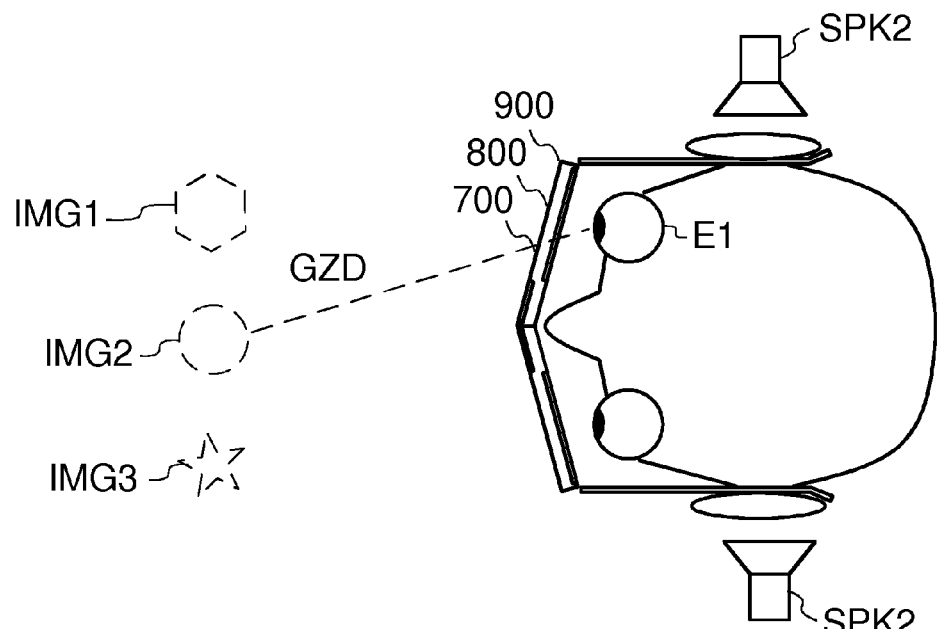
FIG. 5c shows an eye looking at virtual images of objects, wherein the gaze direction of the eye is monitored by a gaze direction detecting device.

Referring to FIG. 5c, virtual images IMG1, IMG2, IMG3 corresponding to the audio sources A1, A2, A3 may also be displayed by a virtual display 800. The listener A4 may place the virtual display near his eye E1 such that when light provided by the virtual display impinges on his eye, he perceives an impression of a large virtual image displayed at an infinite distance.

For example a person may wear goggles 900, which comprise a gaze direction detecting device 700 and a virtual display 800. The goggles may further comprise transducers SPK1, SPK2.

The patent publication WO2007/085682 and the patent application PCT/FI2008/050065 disclose gaze direction detecting devices suitable for the purpose. PCT/FI2008/050065 also discloses goggles, which comprise a gaze direction detecting device and a virtual display.

Figure 6:
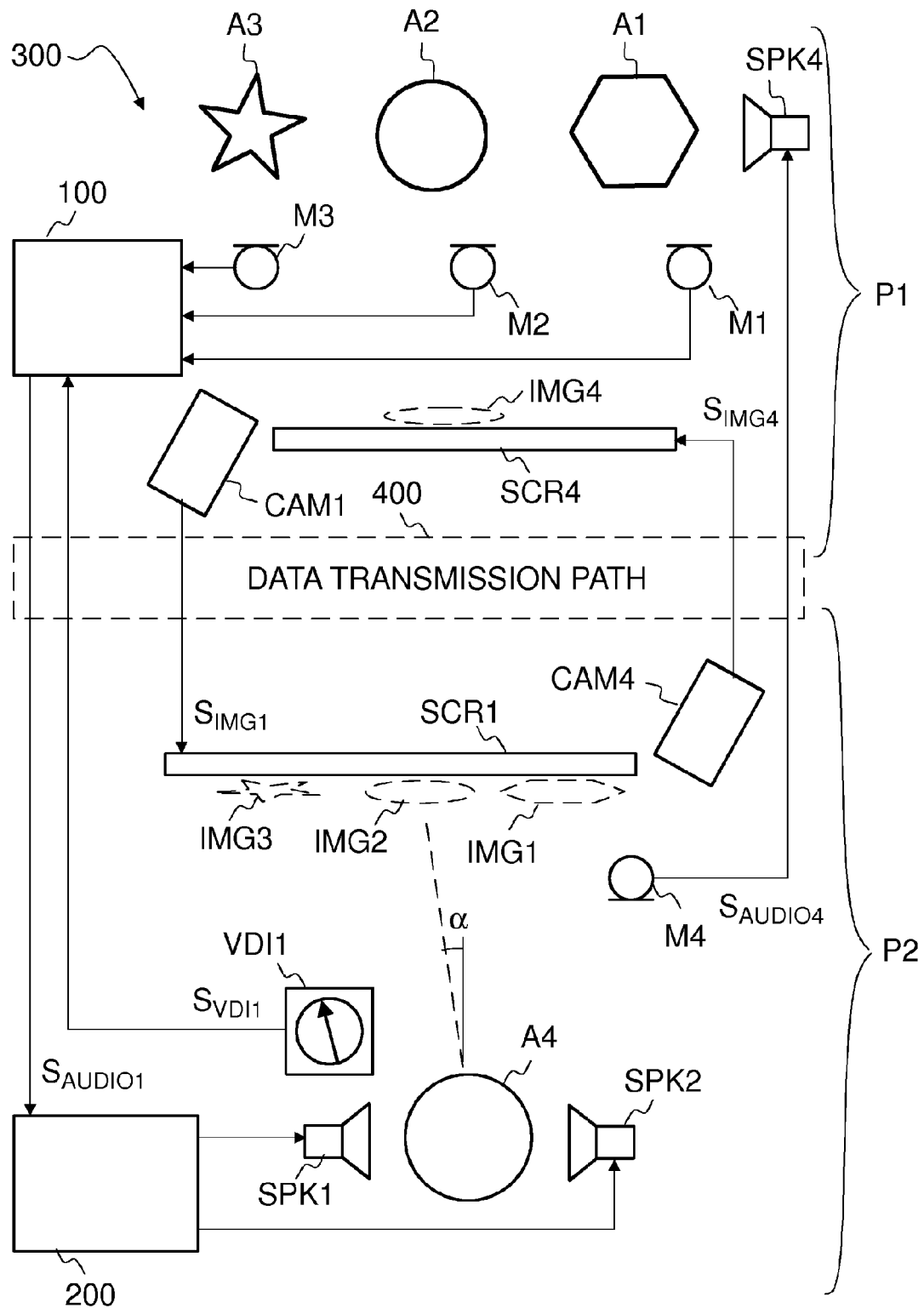
FIG. 6 shows an audio processing system.

FIG. 6 shows an audio processing system 300 comprising a first side P1, a second side P2, and the data transmission path 400. Sounds emitted from the audio sources A1, A2, A3 may be captured by two or more microphones M1, M2, M3. The audio sources A1, A2, A3 may be e.g. participants of a meeting. The system 300 may be e.g. a teleconference system.

The signal processing unit 100 may be arranged to enhance an audio signal originating from a spatial location indicated by the direction selecting unit VDI1. The audio signal $S_{AUDIO1}$ may be sent via the transmission path 400 to the second side P2, where it may be reproduced via one or more transducers K1, K2.

The direction indicator VDI1 may be located on the second side P2 of the system 300. The direction indicator VDI1 may be e.g. a gaze direction detecting device 700, which is arranged to provide a direction signal $S_{VDI1}$ based on the gaze direction of a listener A4. The direction signal $S_{VDI1}$ may be sent from the second side P2 to the first side P1 where it may be coupled to the signal processing unit 100.

Video or still images may be captured by a camera CAM1 on the first side P1, and a corresponding image signal $S_{IMG1}$ may be sent via the transmission path 400 to the second side P2. Video or still images IMG1, IMG2, IMG3 corresponding the audio sources A1, A2, A3 may be displayed on a screen or on a virtual display SCR1 on the second side P2.

Thus, the gaze direction detecting device may be arranged to determine whether the listener A4 is looking at the image IMG1, IMG2, IMG3, and the direction angle α for audio enhancement may be set, respectively.

The system may comprise an encoder to provide e.g. a parameter-coded audio signal $S_{AUDIO1}$. The audio signal $S_{AUDIO1}$ may be decoded by a decoder 200 on the second side P2 and reproduced via transducers SPK1, SPK2.

The system 300 may further comprise a second camera CAM4 for capturing images of the listener A4. A corresponding image signal $S_{IMG4}$ may be sent via the transmission path 400 from the second side P2 to the first side P1. The image IMG4 of the listener A4 may be displayed on a screen SCR1 on the first side P1.

The second camera CAM4 may also be used as an imaging unit of the gaze direction detecting device.

Also an audio signal $S_{AUDIO4}$ may be sent from the second side P2 to the first side P1. The audio signal $S_{AUDIO4}$ may be captured by a microphone M4 and reproduced by a transducer SPK4.

Figure 7A:
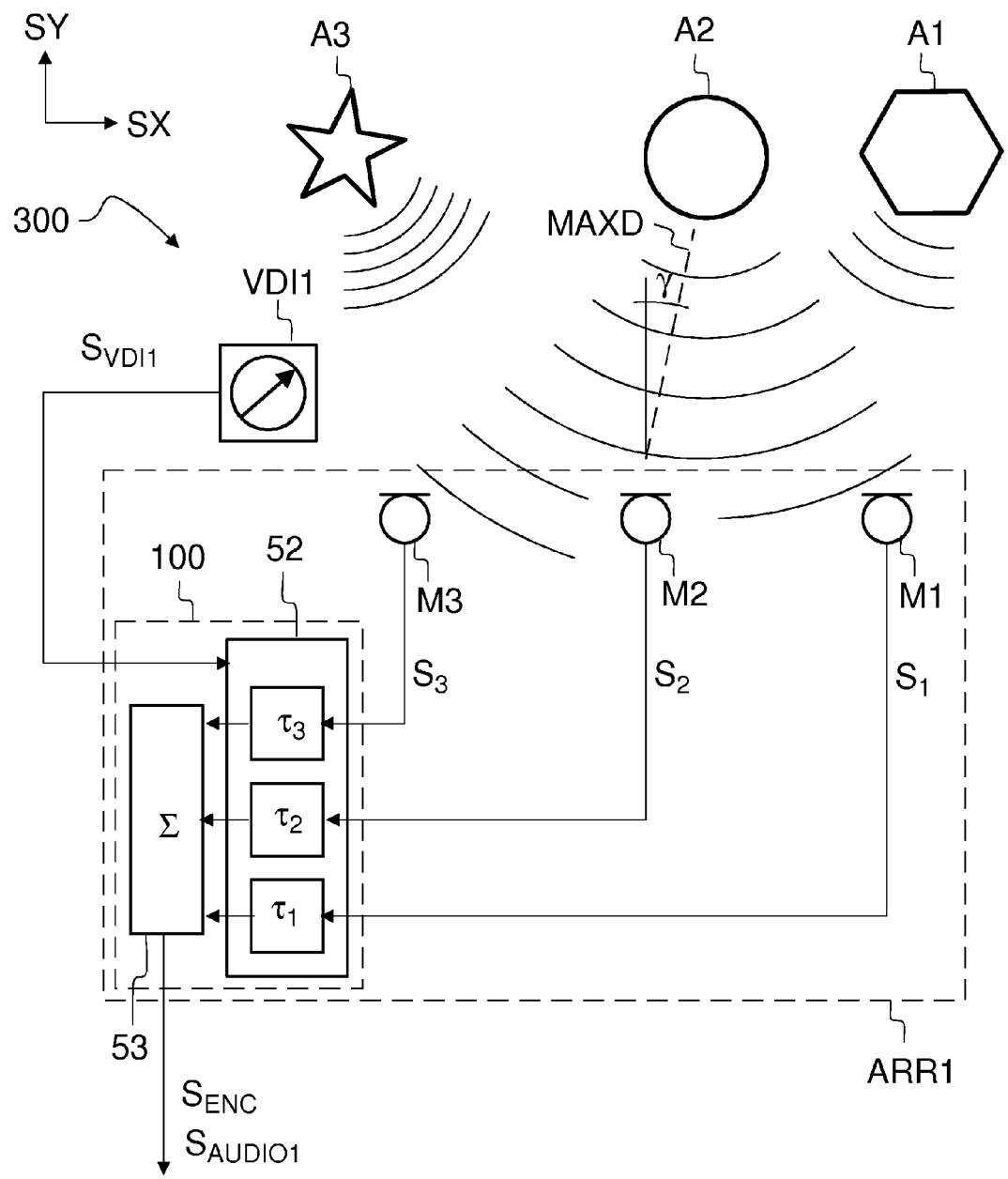
FIG. 7a shows an audio processing system comprising a directional microphone array.

Referring to FIG. 7a, a plurality of microphones M1, M2, M3 may be arranged to operate as a directional microphone array ARR1. The direction of maximum sensitivity of the directional microphone array ARR1 may be controlled by the direction selecting unit VDI1 so as to enhance audio signals originating from a selected location. In particular, direction of maximum sensitivity of the directional microphone array ARR1 may be controlled by a gaze direction detecting device 700.

The microphones of a directional microphone array ARR1 may also be binaural microphones.

The signal processing unit 100 may comprise a delay bank 52 and a summing unit 53. An audio signal $S_1$ captured by a first microphone M1 may be delayed by a first time period $\tau_1$, An audio signal $S_2$ captured by a second microphone M2 may be delayed by a second time period $\tau_2$, An audio signal $S_3$ captured by a third microphone M3 may be delayed by a third time period $\tau_3$, The delays $\tau_1$, $\tau_2$, $\tau_3$ may be adjusted such that audio signals originating from the selected location and captured by the microphones M1, M2, M3 are in the same phase when they are combined in the summing unit 53. The delayed audio signals may be combined e.g. by summing or averaging. The selected location is indicated by the direction signal $S_{VDI1}$.

The directional microphone array ARR1 may comprise e.g. two or more microphones M1, M2, M3. The minimum distance L1 between the audio sources A1, A2, A3 and a microphone M1, M2, M3 may be greater than the maximum distance $W_{13}$ between the microphones M1, M2, M3. The use of e.g. three or more microphones may provide improved directional selectivity.

The output of the summing unit 53 may be enhanced audio signal $S_{ENC}$. If monophonic sound is acceptable, the output of the summing unit 53 may be used as the signal $S_{AUDIO1}$, which is sent via the transmission path to the receiving side of the system 300.

The direction of maximum sensitivity of the directional microphone array ARR1 may be changed without moving the microphones M1, M2, M3 with respect to the audio sources A1, A2, A3.

The direction MAXD of maximum sensitivity may be defined e.g. by an angle $\gamma$ between said direction MAXD and a reference direction SY. Thus, apparatus 300 may be arranged such that the angle $\gamma$ of maximum sensitivity depends on the gaze angle $\alpha$.

Figure 7B:
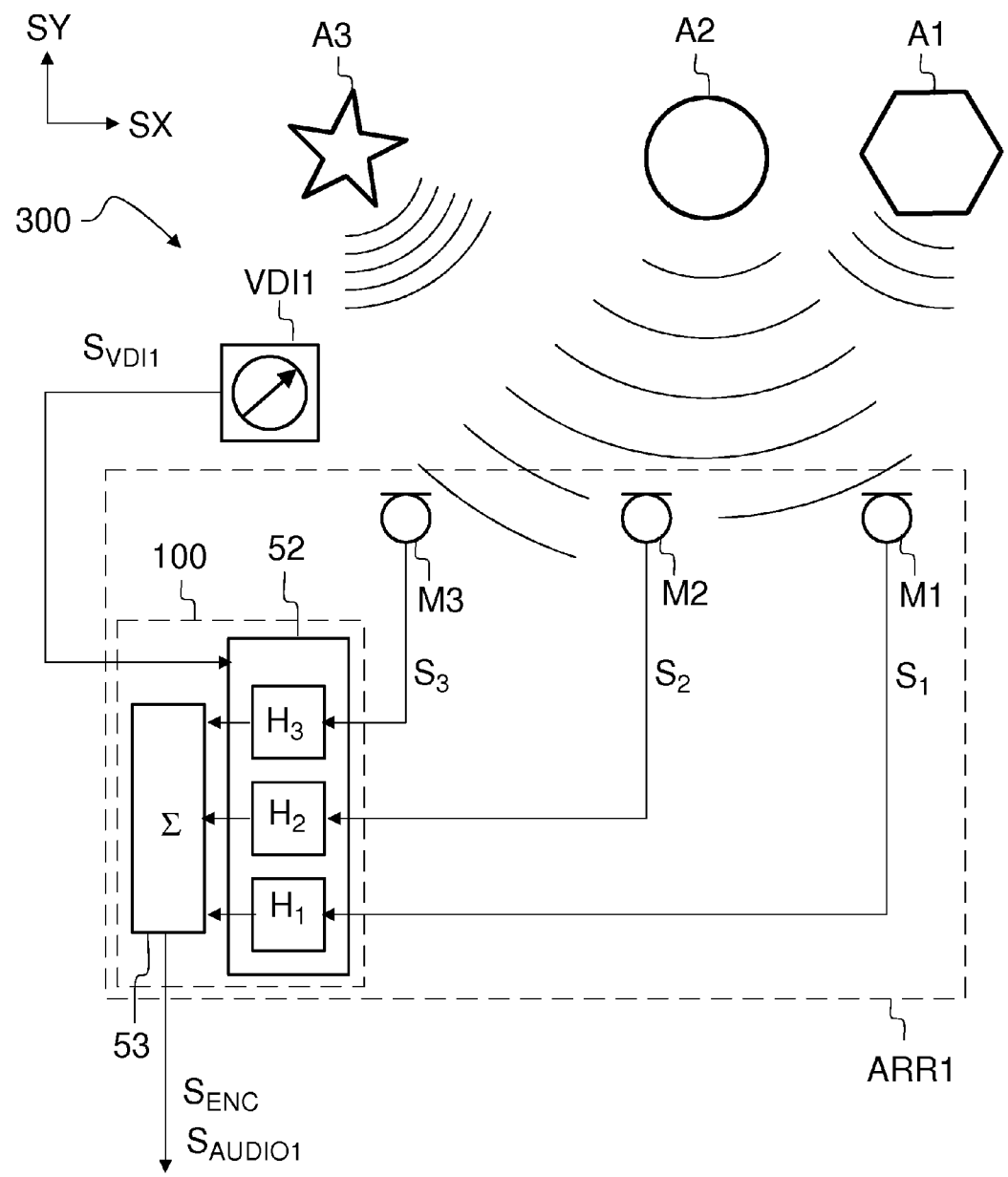
FIG. 7b shows an audio processing system comprising a directional microphone array

Referring to FIG. 7b, the audio signals $S_1$, $S_2$, $S_3$ provided by individual microphones M1, M2, M3 of a directional array ARR1 may be processed by using beamforming filters $H_1$, $H_2$, $H_3$.

The output of the array ARR1 of FIG. 7b is given by the equation $$S_{ENC}(n) = \sum_{m=1}^{M} \sum_{k=0}^{L-1} H_m(n) S_m(n-k) \quad (1)$$

where n denotes discrete time index, M denotes the number of audio signals $S_1$, $S_2$, $S_3$, and L denotes the length of the beam forming filters $H_1$, $H_2$, $H_3$.

The most trivial selections for the filters $H_1$, $H_2$, $H_3$, ... are delay lines, as shown in FIG. 7a. In that case output of the array ARR1 is given by $$S_{ENC}(n) = \sum_{m=1}^{M} S_m(n - \tau_m) \quad (2)$$

where $\tau_1$, $\tau_2$, $\tau_3$, ... denote the time delays of each signal $S_1$, $S_2$, $S_3$, ...

The directionality may also be implemented in the frequency sub-band domain or e.g. in the DFT (discrete fourier transform) domain. In that case the delay for each audio signal $A_1$, $A_2$, $A_3$ may be frequency-dependent.

Figure 7C:
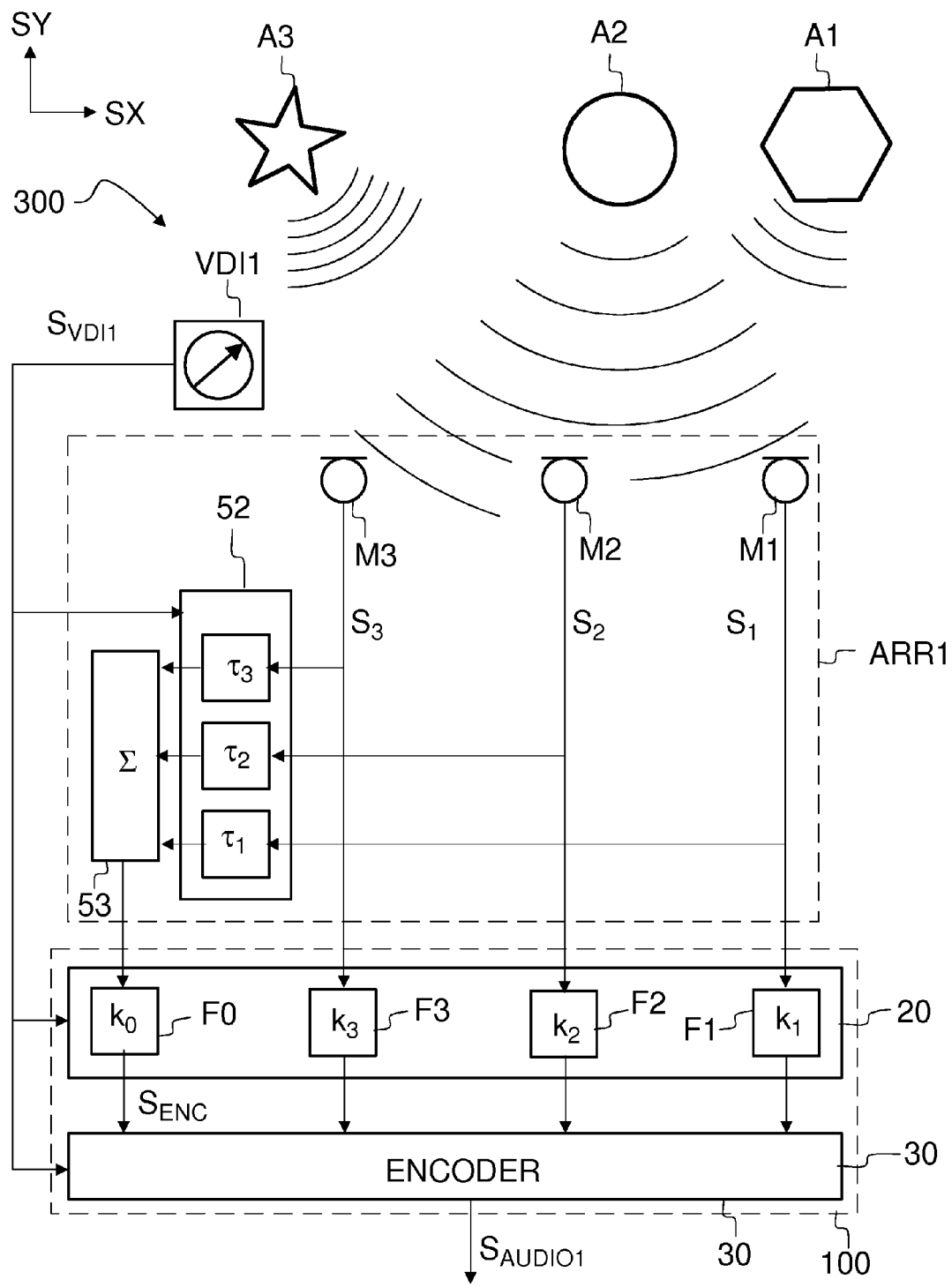
FIG. 7c shows an audio processing system comprising a directional microphone array and a filtering unit.

Referring to FIG. 7c, the output of a directional microphone array ARR1 may be weighed together with outputs $S_1$, $S_2$, $S_3$ of individual microphones M1, M2, M3. In particular, one or more of said individual microphones M1, M2, M3 may be part of said directional microphone array ARR1.

The output of the directional microphone array ARR1 may be enhanced with respect to the outputs of the individual microphones in order to provide an enhanced audio signal $S_{ENC}$. The output of the directional microphone array ARR1 and the audio signals $S_1$, $S_2$, $S_3$ of the individual microphones M1, M2, M3 may be filtered by using respective filters F0, F1, F2, F3. In particular, the output of the directional microphone array ARR1 and the audio signals $S_1$, $S_2$, $S_3$ of the individual microphones M1, M2, M3 may be multiplied with respective filter coefficients $k_0$, $k_1$, $k_2$, $k_3$.

The enhanced audio signal $S_{ENC}$ captured by the directional microphone array ARR1 may be sent at a high bit rate, and audio signals $S_1$, $S_2$, $S_3$ captured by one or more of the individual microphones M1, M2, M3 may be sent at a lower bit rate.

The audio signal captured by the directional microphone array may convey primary audio information, e.g. spoken words or sounds directly emitted from a musical instrument. The audio signals captured by the individual microphones may convey secondary information which may be utilized when reproducing the audio image, e.g. background noise, echos from the walls, or applause.

Figure 8A:
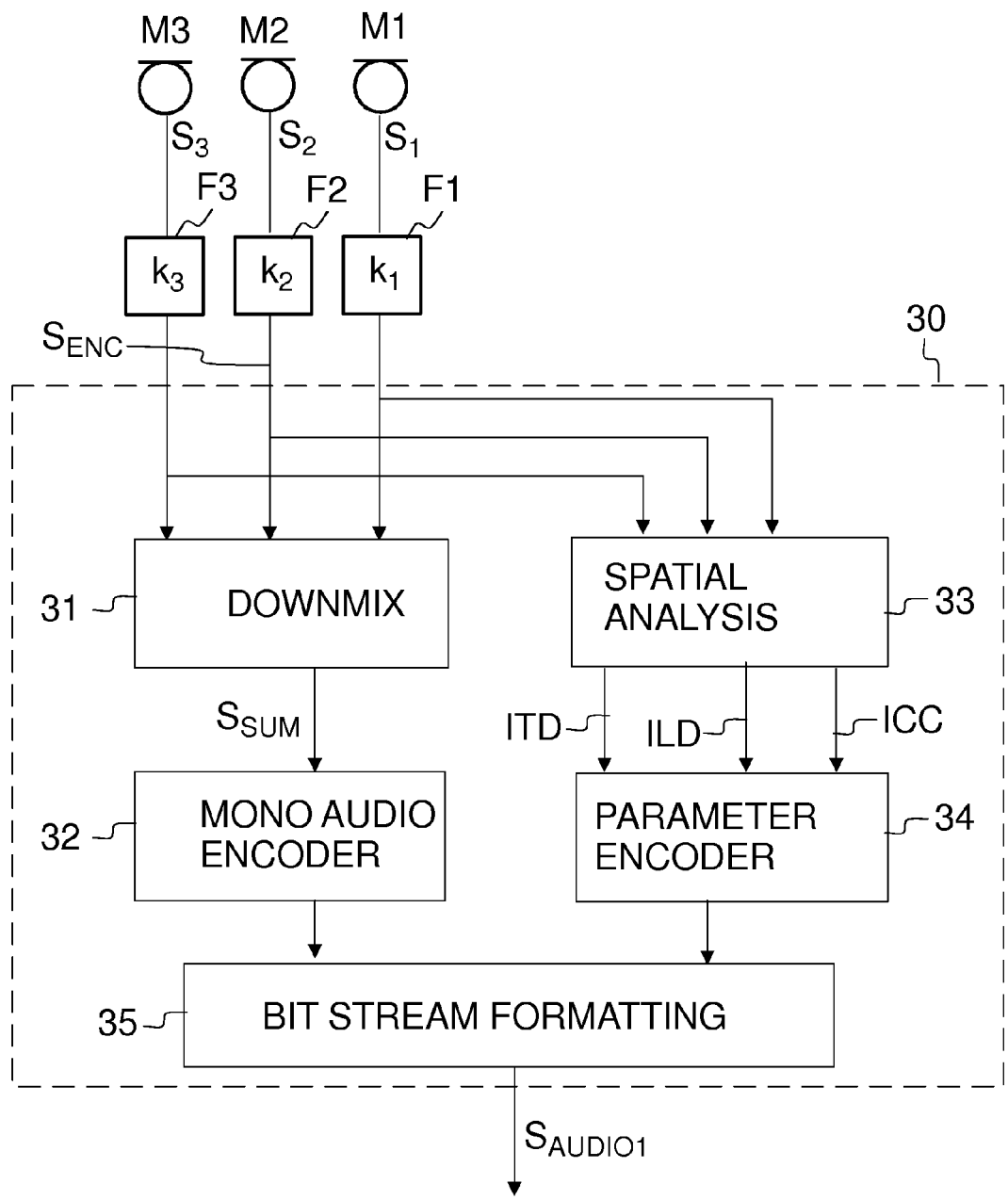
FIG. 8a shows a parametric audio encoder.

FIG. 8a shows a parametric encoder 30. Parametric audio coding methods enable multi-channel and spatial audio coding and representation. The original audio signals may be represented as a downmixed signal $S_{SUM}$ together with a bit stream of parameters describing the spatial audio image. The downmixed signal comprises a reduced number of audio channels. For example, the downmixed signal may be a monophonic sum signal or a two channel (stereo) sum signal.

The parameters may comprise parameters describing e.g. inter-channel level difference (ILD), inter-channel time difference (ITD), and inter-channel coherence (ICC)

This kind of coding scheme may allow extremely efficient compression of multi-channel signals. Furthermore, given that the extracted spatial information is adequate, it may allow decoding into any other spatial mixing format, i.e. for any other loudspeaker set-up. For example, music or conversation captured with binaural microphones may be reproduced through e.g. a 5.1 loudspeaker system.

The encoder 30 may comprise a downmix unit 31, a mono audio encoder 32, a spatial analysis unit 33, a parameter encoder 34, and a bit stream formatting unit 35. In particular, the encoder 30 may be arranged to provide a binaural cue coded (BCC) signal $S_{AUDIO1}$.

For a detailed description of the BCC approach, a reference is made to: F. Baumgarte and C. Faller: "Binaural Cue Coding—Part I: Psychoacoustic Fundamentals and Design Principles"; IEEE Transactions on Speech and Audio Processing, Vol. 11, No. 6, November 2003, and to: C. Faller and F. Baumgarte: "Binaural Cue Coding—Part II: Schemes and Applications", IEEE Transactions on Speech and Audio Processing, Vol. 11, No. 6, November 2003.

Figure 8B:
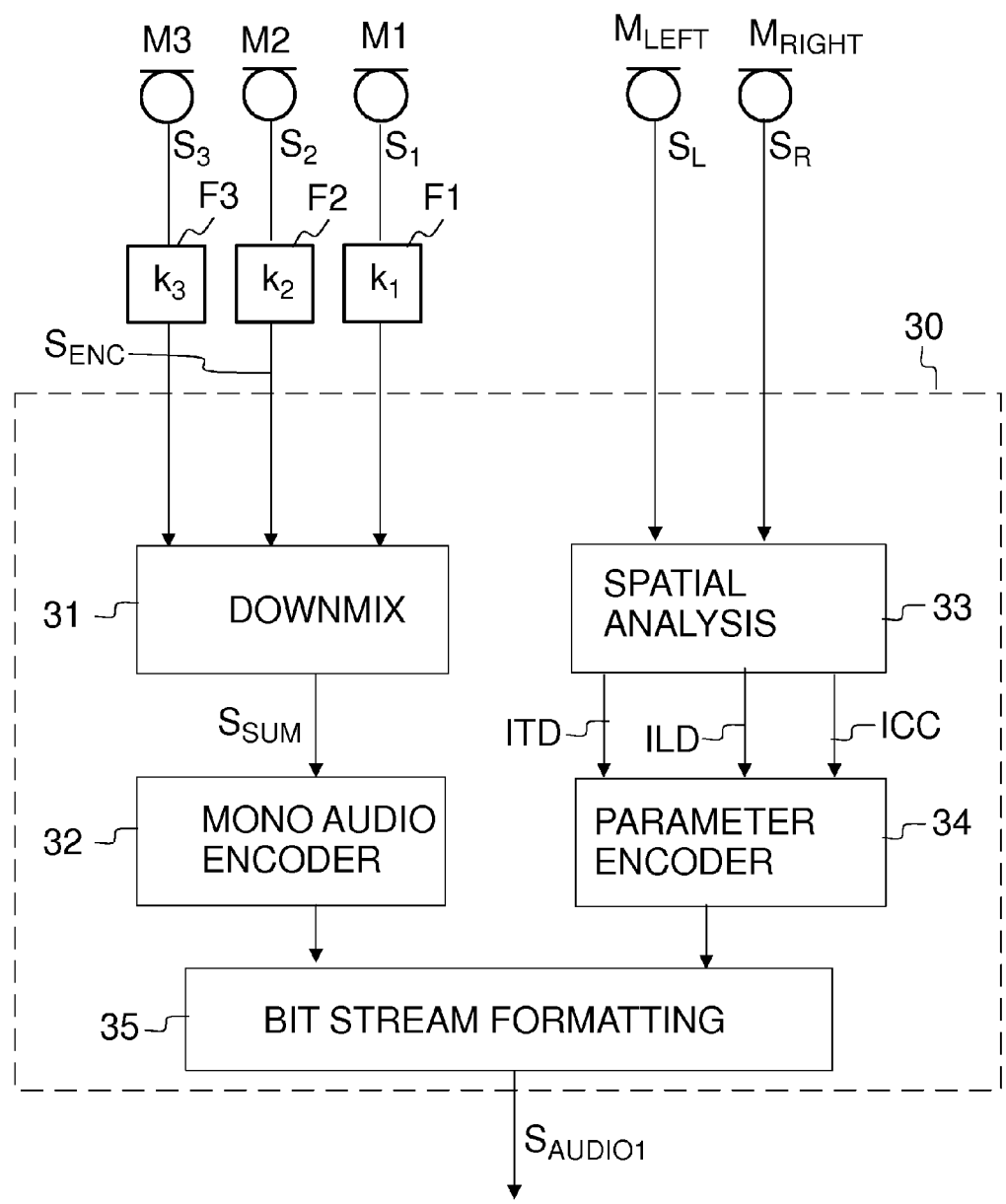
FIG. 8b shows a parametric audio encoder arranged to provide spatial audio parameters based on audio signals captured by additional microphones.

Referring to FIG. 8b, the spatial audio parameters ILD, ITD, and/or ICC may also be determined from further audio signals SL, SR provided by additional microphones $M_{LEFT}$, $M_{RIGHT}$. In other words, the spatial audio parameters may also be determined from signals which are not used for downmixing.

In particular, the additional microphones $M_{LEFT}$, $M_{RIGHT}$ may constitute a set of binaural microphones. The additional microphones $M_{LEFT}$, $M_{RIGHT}$ may be attached e.g. to different sides of a mobile phone or to headphones. The headphones may be worn by the user A5.

Figure 8C:
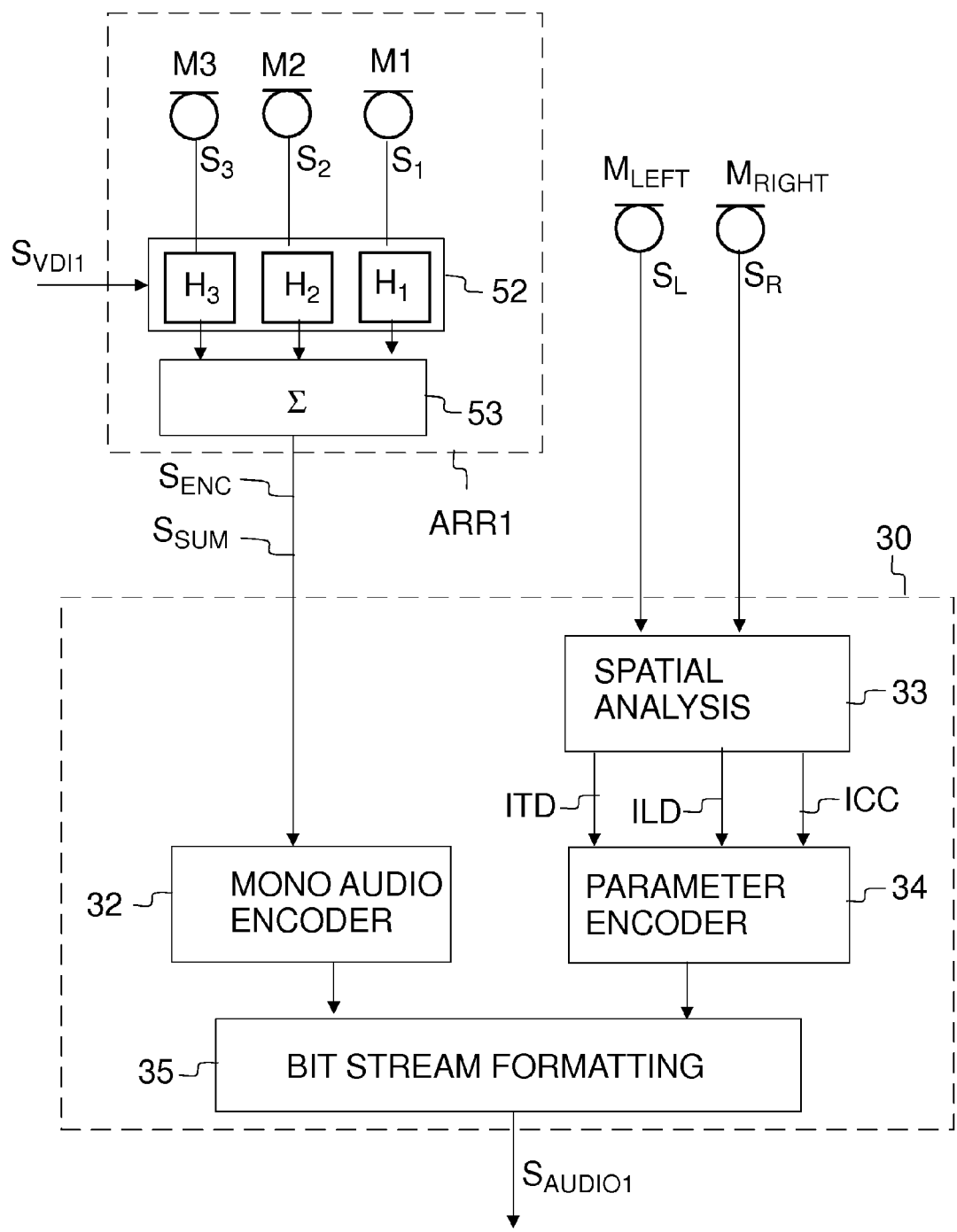
FIG. 8c shows a a directional microphone array arranged to provide a downmixed signal for parametric audio encoding.

Referring to FIG. 8c, an enhanced monophonic output $S_{ENC}$ of a directional microphone array ARR1 may also be used as the downmixed signal $S_{SUM}$ as such, i.e. in that case it is not necessary to utilize the downmixing unit 31 shown in FIG. 8b.

The spatial audio parameters ILD, ITD, and/or ICC may be determined from audio signals SL, SR provided by additional microphones $M_{LEFT}$, $M_{RIGHT}$.

Alternatively, The spatial audio parameters ILD, ITD, and/or ICC may be determined from two or more audio signals $S_1$, $S_2$, $S_3$ provided by individual microphones M1, M2, M3 of the directional microphone array ARR1 (FIG. 7c).

The audio image experienced by the listener A4 may be modified according to the direction signal $S_{VDI1}$.

As was noticed in the context of FIG. 1a, the direction signal $S_{VDI1}$ may also be sent to the decoder 200 to be utilized in the rendering.

If the direction signal $S_{VDI1}$ is provided at the receiving end, a monophonic enhanced signal $S_{ENC}$ provided by a directional microphone array ARR1 may also be rendered in the selected direction by using panning laws. In that case the BCC rendering may even be completely omitted and the user may only concentrate to the audio source the capturing user was concentrating to.

Figure 8D:
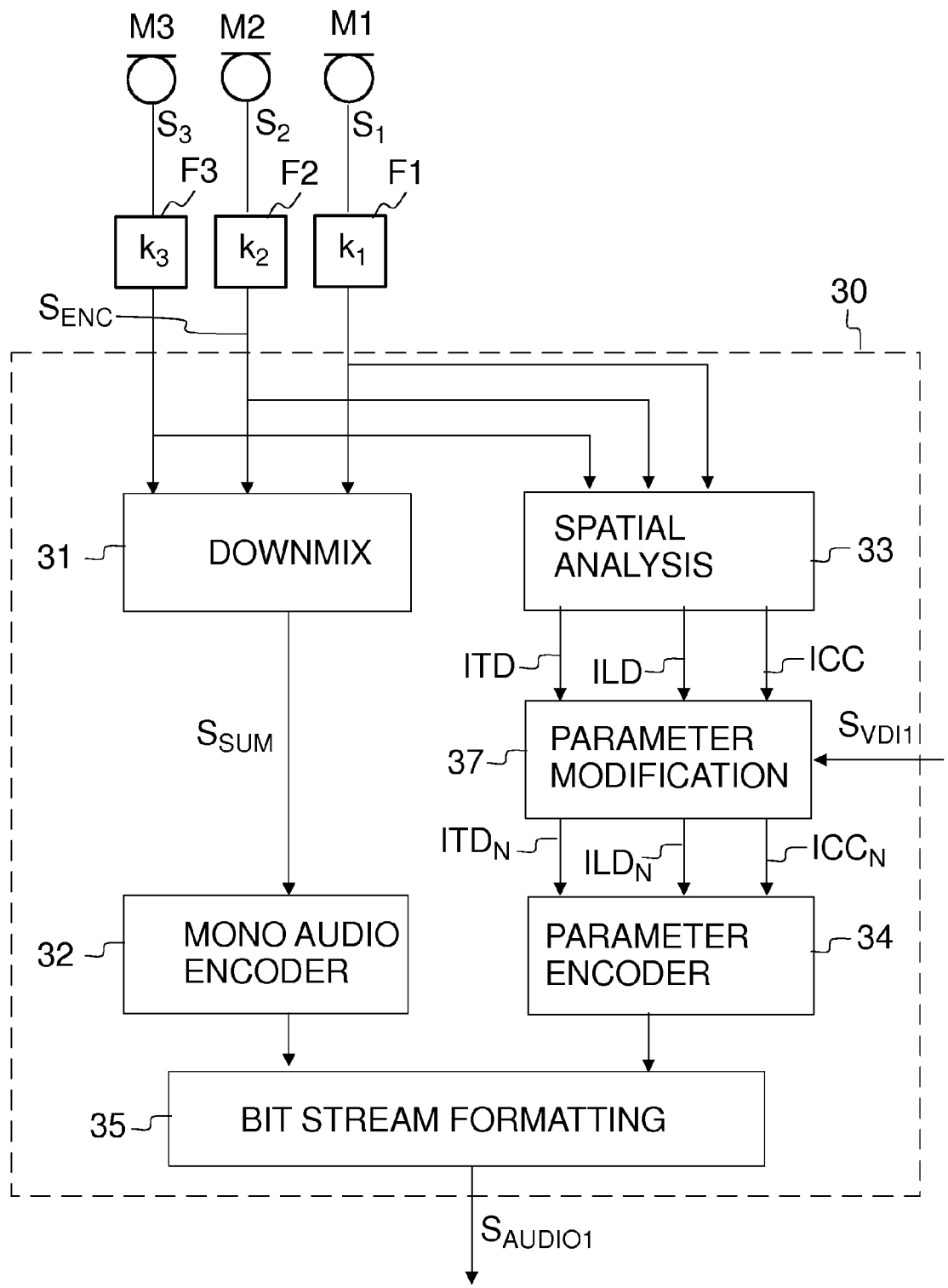
FIG. 8d shows adjusting spatial audio parameters based on a direction signal.

Referring to FIG. 8d, the spatial parameters provided by the encoder 300 may be modified according to the direction signal $S_{VDI1}$ in the transmitting end of the system 300. Consequently, the apparent direction of the reproduced sounds may be adjusted even without sending the direction signal $S_{VDI1}$ via the transmission path 400.

The modification of the spatial audio parameters enables at least two different possibilities for the rendering, i.e. the audio image may be rendered to the desired direction of arrival or the audio image may be rendered to the center of the audio image.

In case of a BCC coded signal $S_{AUDIO1}$, the apparent direction of the reproduced sounds may be adjusted e.g. by modifying the interchannel time difference (ITD) parameters, and by modifying the interchannel level difference (ILD) parameters.

The encoder 30 may further comprise a parameter modifying unit 37 arranged to modify the values of the parameters ILD, ITD, and/or ICC based on the direction signal SVDI1. Thus, the parameter modifying unit 37 may arranged to calculate a modified inter-channel level difference parameters $ILD_N$ from inter-channel level difference parameters ILD provided by the spatial analysis unit 33. The parameter modifying unit 37 may arranged to calculate a modified inter-channel time difference $ITD_N$ parameters from inter-channel time difference ITD parameters provided by the spatial analysis unit 33. The parameter modifying unit 37 may arranged to calculate modified inter-channel coherence parameters $ICC_N$ from inter-channel coherence parameters ICC provided by the spatial analysis unit 33.

The time delay associated with ITD parameter may be adjusted according to the following equation:

$$\tau_{q,NEW} = \tau_q - \tau_m \quad (3)$$

where $\tau_q$ denotes time domain transformation of the inter-channel time difference parameter associated with the qth frequency sub-band, $\tau_{q,NEW}$ denotes time domain transformation of the new modified interchannel time difference parameter associated with the qth frequency sub-band, and $\tau_m$ denotes a time delay corresponding to the direction indicated by the direction signal $S_{VDI1}$.

The interchannel level difference (ILD) parameters may be modified by calculating gain coefficients $g_{LEFT}$ and $g_{RIGHT}$ as follows:

$$g_{LEFT} = \sqrt{\frac{\theta_{RIGHT} - \phi}{\theta_{RIGHT} - \theta_{LEFT}}} \quad (4a)$$

$$g_{RIGHT} = \sqrt{\frac{\theta_{LEFT} - \phi}{\theta_{LEFT} - \theta_{RIGHT}}} \quad (4b)$$

where φ denotes the direction angle corresponding to the direction signal $S_{VDI1}$, $\theta_{LEFT}$ denotes an angle to a left transducer SPK1, $\theta_{RIGHT}$ denotes an angle to a right transducer SPK2. If the positions of the transducers are selected to correspond to the left channel and to the right channel of head-mounted microphones, then $\theta_{LEFT} = -\pi/2$ and $\theta_{RIGHT} = \pi/2$. The interchannel level difference (ILD) parameters may now be modified as follows:

$$\Delta L_{q,NEW} = \Delta L_q \log_{10}\left(\frac{g_{LEFT}}{g_{RIGHT}}\right) \quad (5)$$

where $\Delta L_q$ denotes an interchannel level difference parameter associated with a q:th frequency sub-band, and $\Delta L_q$ denotes a new modified interchannel level difference parameter associated with the q:th frequency sub-band.

Also the inter-channel coherence parameters ICC may be modified. However, that is not necessary. In other words, the parameters $ICC_N$ may be equal to ICC.

The modified parameters $ILD_N$ and $ITD_N$ may now be quantized and provided for transmission to the decoder 200 via the transmission path 400, or they may be stored e.g. in a memory for subsequent use or transmission.

In case of BCC coding, the encoder 30 may be arranged to operate such that the inter-channel level difference parameters and the inter-channel time difference parameters corresponding to the most important audio source indicated by the direction signal $S_{VDI1}$ are substantially equal to zero. The inter-channel level difference parameters and the inter-channel time difference parameters corresponding to secondary audio sources may substantially deviate from zero, respectively. Thus, the inter-channel level difference parameters and/or the inter-channel time difference parameters may be quantized by using relatively coarse quantization in the encoding unit 34, without significantly degrading the quality of the reproduced audio signal corresponding to the most relevant audio source. The quality of reproduced audio signals corresponding to the secondary audio sources may be degraded, because they are of secondary importance.

The processed signal $S_{AUDIO1}$ may also comprise parameters, which describe the estimated direction of arrival of each sound $SND_1$, $SND_2$, $SND_3$ emitted from the sound sources A1, A2, A3. Thus, BCC parameterization may be replaced or augmented with directional information. For example, each sub-band and time frame of a downmixed signal may be associated with a direction parameter $DOF_q$, and a processed audio signal $S_{AUDIO1}$ may comprise a downmixed signal together with determined direction parameters $DOF_q$. The downmixed signal may be e.g. a sum of audio signals $S_1$, $S_2$, $S_3$.

In case of directional parameters, a parameter modifying unit may be arranged to determine a modified direction parameter $DOF_{q,NEW}$ e.g. by the equation:

$$DOF_{q,NEW} = DOF_q - \varphi \quad (6)$$

where $DOF_{q,NEW}$ denotes a modified direction parameter associated with a $q^{th}$ frequency sub-band, $DOF_q$ denotes a direction parameter associated with a $q^{th}$ frequency sub-band provided by a spatial analysis unit, and $\varphi$ denotes a direction angle corresponding to a direction indicated by the direction signal $S_{VDI1}$.

The processed audio signal $S_{AUDIO1}$ may comprise the spatial audio parameters ILD, ITD, ICC, and/or $DOF_q$. However, the spatial audio parameters may also be stored or sent via the transmission path 400 separately.

The parameters ILD, ITD, and/or $DOF_q$ determine the locations of audio sources in a reproduced auditory image, i.e. the parameters determine the locations of the audio sources in the subsequent decoding step of the processed audio signal $S_{AUDIO1}$.

Modification of the spatial audio parameters ILD, ITD, and/or $DOF_q$ enables controlling of the audio source locations in the subsequent decoding step. Thanks to modifying the spatial audio parameters, the location of the sound sources in the reproduced auditory image may be adjusted even when the microphones M1, M2, M3 remain stationary with respect to the audio sources A1, A2, A3. For example, sounds originating from the selected directions may be kept at a predetermined location of the reproduced auditory image even when the selected direction is changed. In other words, the parameters ILD, ITD may be adjusted such that a first sound $SND_1$ originating from a first audio source A1 appears to come from a predetermined location of the reproduced auditory image when the direction of said first audio source is indicated by the direction signal $S_{VDI1}$, and a second sound $SND_2$ originating from a second audio source A2 appears to come from the same predetermined location of the reproduced auditory image when the direction of said second audio source is indicated by the direction signal $S_{VDI1}$. The sounds originating from the selected directions may be kept e.g. at the center of the reproduced auditory image. The reproduced auditory image may also be e.g. rotated according to the direction signal $S_{VDI1}$.

Instead of enhancing, a direction indicated by the direction indicator VDI1 may also be used to suppress audio signals originating from a location corresponding to said indicated direction. Thus, disturbing sounds originating from a specific location may be suppressed or even completely eliminated from an audio image sent via the transmission path 400.

The signal processing unit 100 may be arranged to enhance sounds originating from a first selected location and to substantially eliminate sounds originating from a second location. The locations may be indicated by a gaze direction detecting device 700, and the data processing unit 100 may be arranged to take the first location and the second location simultaneously into account by a command inputted via a user interface. For example, the gaze direction detecting device 700 may comprise an "enhance" button and an "eliminate" button. If the user A4 wishes to enhance sounds originating from a first direction, he may look at said first direction and push the "enhance" button. If the user wishes to suppress sounds originating from a second location, he may look at said second direction and push the "eliminate" button.

The transmission path 400 may be e.g. internet, radio link, mobile telephone network, or a satellite communication system.

The audio signals may be stored in a memory before or simultaneously with reproduction.

The signal processing unit 100 may be implemented in a programmable data processing unit, e.g. in a computer. The signal processing unit 100 may comprise a computer readable medium (MEM1) comprising program code, which when executed by a data processor is for enhancing and/or suppressing sounds according examples presented above.

The audio signals provided by the microphones M1, M2, M3 and the direction signal $S_{VDI1}$ provided by the direction selecting unit VDI1 may be coupled to the data processing unit via one or more inputs $IN_1$, $IN_2$, $IN_3$, and the data processing unit 100 may be arranged to send a processed audio signal $S_{AUDIO1}$ e.g. via internet and/or via a mobile telephone network.

The relationship between a direction indicated by the direction determining unit VDI1 and the direction of maximum sensitivity is trivial when the distance L1 between the audio sources and the microphones is large when compared with the distance $W_{13}$ between the microphones, and when the distance $W_{VM}$ between the direction determining unit VDI1 and the microphones is small when compared with the distance L1 between the audio sources and the microphones. These conditions are typically fulfilled when a gaze direction detecting device is used in the vicinity of a directional microphone.

If the distance between the direction detecting unit VDI1 and the microphones is large, the data processing unit 100 may be initialized before use.

The initialization comprises finding a function, which describes how the values of the signal $S_{VDI1}$ provided by the direction selecting unit VDI1 can be mapped to the actual direction or location of maximum sensitivity of the audio capturing set-up.

The data processing unit 100 may be initialized e.g. by calibration. For example, a test sound source may be moved in a room or in a television studio, while the position of said sound source is all the time followed by the direction selecting unit VDI1. The data processing unit may be arranged to determine and store the values of the coefficients of the filtering unit 20 and/or the delays of the delay bank 52 based on the calibration such that the direction of maximum sensitivity can in each case be associated with the direction indicated by the direction selecting unit VDI1.

Alternatively, the signal processing unit 100 may be initialized by a method comprising:
emitting sound from a sound source,
varying the location of maximum sensitivity of the microphone array,
looking at said sound source or an image corresponding to said sound source, and
sending a command to the signal processing unit 100 via a user interface when the intensity of a reproduced sound of said sound source reaches a maximum.

For example, a participant A2 may be asked to speak, while the sensitivity direction of a directional microphone array ARR1 is scanned. The listener A4 may look at the participant A2 or a displayed image of said participant, while a gaze direction detecting device 700 is arranged to monitor the gaze direction of the listener A4. The listener may push a calibration button when the sound of the participant A2 appears to reach the loudest volume. For complete calibration, the same procedure may be repeated also for the participant A1 and the participant A3.

Alternatively, the positions of the microphones M1, M2, M3, the estimated positions of the sound sources A1, A2, A3, the position of the direction selecting unit VDI1, and a reference direction of the direction selecting unit VDI1 may be inputted to a data processing unit via a keyboard or a graphical user interface. The data processing unit may be arranged to calculate the coefficients of the filtering unit 20 and/or the delays of the delay bank 52 for each direction indicated by the direction selecting unit VDI1 based on said positions.

In an embodiment, it is not even necessary to display visual images to the listener A4 on the receiving end of the system 300. The listener A4 may e.g. detect on the basis of a reproduced auditory image whether the most interesting audio source is located in the left part, in the center part, or in the right part of an auditory image. Consequently, the listener A4 can operate a direction indicator VDI1 such that the location of the most interesting audio source is selected.

If desired, the transmitted signals may be multiplexed at the transmitting end of the system 300 and demultiplexed at the receiving end of the system 300. The system 300 may comprise two or more transducers SPK1, SPK2 to reproduce an audio image.

If desired, decoded audio signals may also be filtered at the receiving end of the system 300, in order to restore the level of the enhanced audio signal with respect to the other audio signals. The decoder 200 may comprise a filter bank (not shown). For example, if the level of the audio signal $S_2$ has been increased at the transmitting end by using a filter F2, the corresponding decoded audio signal may be suppressed at the receiving end. Consequently, a higher bit rate may be allocated for audio signals originating from the most relevant direction, while the distribution of the levels of the sounds reproduced by the transducers SPK1, SPK2 may substantially correspond to the original distribution of the levels of the original sounds $SND_1$, $SND_2$, $SND_3$. For example, new sets of filter coefficients may be determined at the receiving end based on the direction signal $S_{VDI1}$. Alternatively, the values of the filter coefficients $k_1$, $k_2$, $k_3$ may be sent via the transmission path 400 from the signal processing unit 100 to the decoder 200, where decoded audio signals may be multiplied e.g. by inverse values $1/k_1$, $1/k_2$, $1/k_3$ in order to restore the original sound level distribution between the different audio channels.

The system 300 may comprise a position detecting unit for determining the absolute position of the direction determining unit VDI1. For example, the direction determining unit VDI1 may comprise a GPS navigator (Global Positioning System). Also the position of the direction determining unit VDI1 may be stored in a memory or sent via the transmission path 400.

Further embodiments may facilitate linking sounding objects to their physical location even when they are recorded from a distance.

Figure 9:
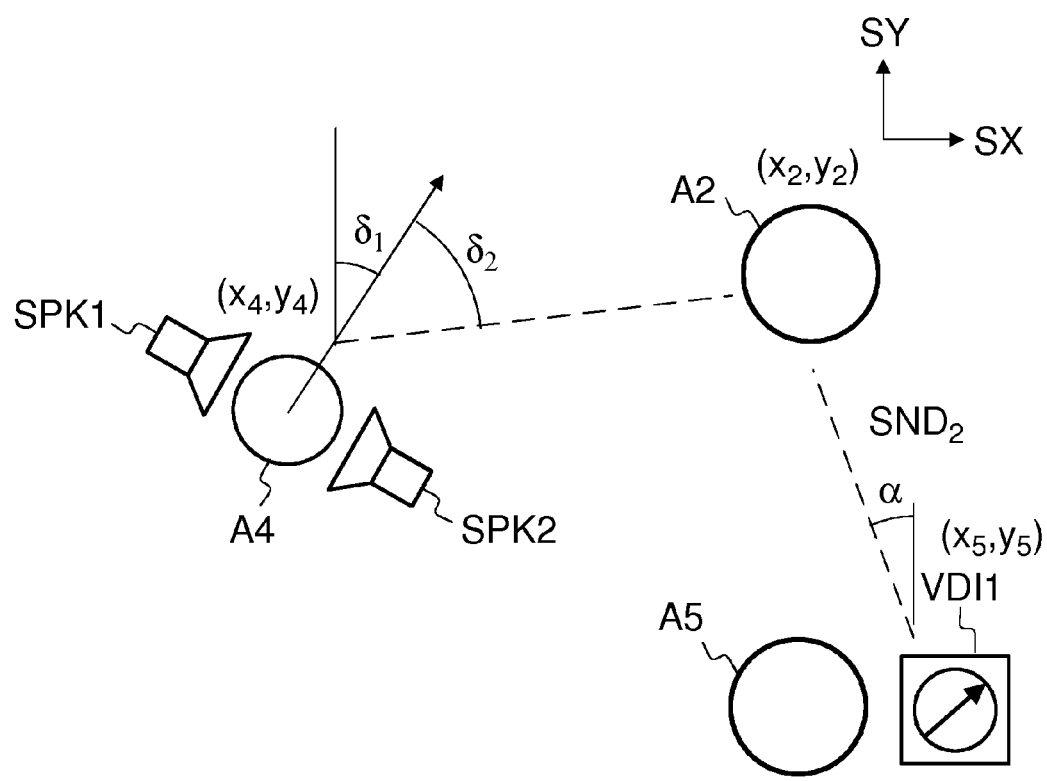
FIG. 9 shows creating a virtual sound field to a listener based on the position and orientation of said listener.

FIG. 9 shows creating a virtual sound field to a listener A4 based on the position and orientation of said listener A4. A sound source A2 may be located at coordinates $(x_2,y_2)$. A user A5 may operate a direction detecting unit VDI1 at coordinates $(x_5,y_5)$. The listener A4 may be located at coordinates $(x_4,y_4)$. The coordinates $(x_4,y_4)$ and $(x_5,y_5)$ may be determined e.g. by satellite navigation devices carried by the user A5 and the listener. The orientation angle $\delta_1$ of the listener A4 may be determined e.g. by a magnetic compass.

The user A5 may operate a direction detecting unit VDI1 such that the direction angle $\alpha$ of the sound source A2 with respect to a reference direction (e.g. the direction SY) is known.

In some embodiments, the direction angle $\alpha$ of the sound source A2 with respect to a reference direction may also be determined by summing a first angle and a second angle. Said first angle may be determined e.g. by a compass, and said second angle may be determined e.g. by the direction detecting unit VDI1.

Consequently, the coordinates $(x_2,y_2)$ of the sound source A2 may be estimated based on the coordinates $(x_5,y_5)$, based on the direction angle $\alpha$, and based on the distance between the user A5 and the sound source A2. The distance may be estimated and inputted to a signal processing device.

The direction detecting unit VDI1 may also comprise two gaze direction detecting units to monitor the gaze direction of both eyes of the user A5, i.e. the a gaze direction detecting device may be stereoscopic. The distance between the user A5 and the sound source A2 may be determined from the signals provided by a stereoscopic gaze direction detecting device.

Sounds emitted from the sound source A2 may be captured, coded, and sent to a decoder 200 of the listener A4 such that the sounds of the source A2 may be reproduced via the transducers SPK1, SPK2. In particular, the listener A4 may wear headphones SPK1, SPK2.

The estimated coordinates of the sound source A2 may be sent as side information to the decoder 200 of the listener A4. The direction angle $\delta_2$ of the sound source A2 with respect to the orientation of the listener A4 may be determined based on the orientation angle $\delta_1$ of the listener and based on the coordinates $(x_2,y_2)$ and $(x_4,y_4)$.

A virtual sound field may now be created for the listener A4 by rendering the processed audio signal $S_{AUDIO1}$ by using the angle $\delta_2$ as an angle of arrival.

The listener A4 may be physically present at the coordinates $(x_4,y_4)$, wherein the audio image may be formed of actual ambient sounds augmented with sounds transmitted via the transmission path.

The audio field experienced by the listener A4 may also be augmented by adding virtual sound-emitting objects at the actual locations of real sound sources even when the real sound sources are not active. In other words, transducers SPK1, SPK2 may be arranged to reproduce previously recorded sounds.

The distance between the listener A4 and the audio source A2 may be used to control the volume of the rendered sound. Thus, if the listener A4 is farther away from the sound source A2 than the user A5, when the sounds were recorded, then the listener A4 may hear the sounds at a lower volume than the user A5 originally did.

Audio source enhancement according to detected gaze direction may be utilized in a TV or radio studio in order to rapidly select the most relevant audio source for limited-bandwidth transmission.

Audio source enhancement according to detected gaze direction may be applied to e.g. telephony, audio sharing, or free viewpoint video services. Said services may be provided e.g. via internet or via mobile telephone network.

For the person skilled in the art, it will be clear that modifications and variations of the devices and the method according to the present invention are perceivable. The particular embodiments described above with reference to the accompanying drawings are illustrative only and not meant to limit the scope of the invention, which is defined by the appended claims.

The invention claimed is:

1. An apparatus comprising at least one processor and at least one memory including computer program code configured to, with the processor, cause the apparatus to:

receive two or more different audio signals from two or more microphones;

receive a direction signal based at least in part on a gaze location time satisfying a predetermined time period, wherein the direction signal is updated in response to the gaze location time satisfying the predetermined time period;

generate a processed audio signal from said two or more different audio signals, said processed audio signal comprising an enhanced audio signal corresponding to a sound originating from a location indicated by said direction signal;

determine one or more spatial parameters;

provide said one or more spatial parameters for controlling audio source locations;

modify the values of said one or more spatial parameters based on said direction signal wherein said spatial parameters comprise at least one of interchannel time difference parameters or interchannel level difference parameters;

provide the modified values of said spatial parameters in subsequent decoding of said processed audio signal; and allocate a first bit rate audio transmission for said two or more different audio signals originating from the location indicated by said direction signal;

otherwise allocate a second bit rate audio transmission for said two or more different audio signals originating from locations other than the location indicated by said direction signal, wherein the first bit rate audio transmission is greater than the second bit rate audio transmission.

2. The apparatus according to claim 1 wherein said direction selecting unit further comprises an electronic compass, an accelerometer, or a gyroscope.

3. The apparatus according to claim 1 comprising an interface for receiving said direction signal sent via a transmission path.

4. The apparatus according to claim 1 comprising a damping unit to reduce fluctuations in said direction information.

5. The apparatus according to claim 1 comprising two or more microphones arranged to operate as a directional microphone array, wherein the direction of maximum sensitivity of said directional microphone array is arranged to be adjusted based on said direction signal.

6. The apparatus according to claim 1 comprising a position detecting unit to determine the location of said direction selecting unit.

7. The apparatus according to claim 6 wherein said position detecting unit is based on a satellite navigation system.

8. The apparatus according to claim 1, wherein said processed audio signal is binaural cue coded.

9. The apparatus according to claim 1 wherein said spatial parameters comprise parameters describing a direction of arrival of a sound.

10. A method, comprising:

receiving, at a signal processing unit, two or more audio signals from two or more microphones;

receiving a direction signal based at least in part on a gaze location time satisfying a predetermined time period, wherein the direction signal is updated in response to the gaze location time satisfying the predetermined time period;

generating a processed audio signal from said two or more different audio signals, said processed audio signal comprising an enhanced audio signal corresponding to a sound originating from a location indicated by said direction signal, determine one or more spatial parameters;

providing said one or more spatial parameters for controlling audio source locations;

modifying the values of said one or more spatial parameters based on said direction signal wherein said spatial parameters comprise at least one of interchannel time difference parameters or interchannel level difference parameters;

providing the modified values of said spatial parameters in subsequent decoding of said processed audio signal; and allocating a first bit rate audio transmission for said two or more different audio signals originating from the location indicated by said direction signal;

otherwise allocating a second bit rate audio transmission for said two or more different audio signals originating from locations other than the location indicated by said direction signal, wherein the first bit rate audio transmission is greater than the second bit rate audio transmission.

11. The method according to claim 10 wherein said direction selecting unit further comprises an electronic compass, an accelerometer, or a gyroscope.

12. The method according to claim 10 comprising receiving said direction signal sent via said transmission path.

13. A computer program product comprising at least one computer-readable storage medium having computer-executable program code instructions stored therein, the computer-executable program code instructions including program code instructions for:

receiving two or more audio signals from two or more microphones;

receiving a direction signal based at least in part on a gaze location time satisfying a predetermined time period, wherein the direction signal is updated in response to the gaze location time satisfying the predetermined time period;

generating a processed audio signal from said two or more different audio signals, said processed audio signal comprising an enhanced audio signal corresponding to a sound originating from a location indicated by said direction signal, determine one or more spatial parameters;

providing said one or more spatial parameters for controlling audio source locations;

modifying the values of said one or more spatial parameters based on said direction signal wherein said spatial parameters comprise at least one of interchannel time difference parameters or interchannel level difference parameters;

providing the modified values of said spatial parameters in subsequent decoding of said processed audio signal; and allocating a first bit rate audio transmission for said two or more different audio signals originating from the location indicated by said direction signal;

otherwise allocating a second bit rate audio transmission for said two or more different audio signals originating from locations other than the location indicated by said direction signal, wherein the first bit rate audio transmission is greater than the second bit rate audio transmission.

14. The computer program product according to claim 13, including program code instructions for:

receiving said direction signal sent via said transmission path.

15. The apparatus according to claim 1 further causing the apparatus to receive a command by a user interface to enhance the processed audio signal relating to said gaze location.

16. The method according to claim 10 further comprising receiving a command by a user interface to enhance the processed audio signal relating to said gaze location.

17. The computer program product according to claim 13, including program code instructions for receiving a command by a user interface to enhance the processed audio signal relating to said gaze location.

\* \* \* \* \*